(12) United States Patent
Ko et al.

(10) Patent No.: US 7,294,379 B2
(45) Date of Patent: Nov. 13, 2007

(54) COLOR CHANGING DEVICE FOR TIME INDICATING LABEL AND METHODS OF MAKING AND USING THE SAME

(75) Inventors: Chan U. Ko, Arcadia, CA (US); Eung Lee, Mentor, OH (US); Donald E. Banks, Huntington Beach, CA (US); Jerry G. Hodsdon, Forestdale, MA (US); Jesse C. Ercillo, Covina, CA (US)

(73) Assignee: Avery Dennison Corporation, Pasadena, CA (US)

( * ) Notice: Subject to any disclaimer, the term of this patent is extended or adjusted under 35 U.S.C. 154(b) by 494 days.

(21) Appl. No.: 10/383,460

(22) Filed: Mar. 7, 2003

(65) Prior Publication Data

US 2004/0013839 A1    Jan. 22, 2004

Related U.S. Application Data

(60) Provisional application No. 60/362,471, filed on Mar. 7, 2002.

(51) Int. Cl.
*B32B 9/00* (2006.01)
*B32B 33/00* (2006.01)
*G01N 31/00* (2006.01)
*G04F 1/00* (2006.01)

(52) U.S. Cl. .................. 428/40.1; 428/41.7; 436/2; 368/327

(58) Field of Classification Search ............... 428/40.1, 428/41.7, 41.8; 436/2; 368/327
See application file for complete search history.

(56) References Cited

U.S. PATENT DOCUMENTS 3,243,303 A    3/1966    Johnson ................. 426/88

(Continued)

FOREIGN PATENT DOCUMENTS

EP          0 022 284          1/1981

(Continued)

OTHER PUBLICATIONS

Eastman Chemical Company webpage (1 sheet) and MSDS (5 sheets) for EASTMAN PC 349W product, MSDS revision date Sep. 26, 2001.

(Continued)

*Primary Examiner*—Rena Dye
*Assistant Examiner*—Patricia L. Nordmeyer
(74) *Attorney, Agent, or Firm*—Renner, Otto, Boisselle & Sklar, LLP

(57) ABSTRACT

The present invention relates to the present invention relates to a time indicating label comprising (a) a label substrate having a first and second surface, (b) an acid-base indicator composition, and (c) an activator composition, wherein one of (b) or (c) are on the first surface of the substrate and wherein (b) and (c) when brought in contact remain adhered. The label may have a pressure sensitive adhesive on the second surface of the label. The invention further relates to a method of using the time-temperature indicating label. The labels provide an effective means for determine the safety of frozen foods. The labels also provide a means of providing security by providing name badges that are time sensitive and may not be reused. The name badges provide a means to monitor the length of a visitor's time and prevents reusing the name badge.

50 Claims, 18 Drawing Sheets

U.S. PATENT DOCUMENTS

| | | | | |
|---|---|---|---|---|
| 3,520,124 A * | 7/1970 | Myers | ................... | 368/92 |
| 3,922,917 A | 12/1975 | Ayres | ................... | 374/106 |
| 3,942,467 A | 3/1976 | Witonsky | ................... | 116/207 |
| 3,966,414 A | 6/1976 | Khattab et al. | ................... | 422/119 |
| 4,057,029 A | 11/1977 | Seiter | ................... | 374/106 |
| 4,137,049 A | 1/1979 | Couch et al. | ................... | 422/56 |
| 4,154,107 A | 5/1979 | Giezen et al. | ................... | 116/207 |
| 4,248,597 A | 2/1981 | McNeely | ................... | 116/206 |
| 4,277,974 A | 7/1981 | Karr et al. | ................... | 374/102 |
| 4,804,275 A | 2/1989 | Kang et al. | ................... | 374/162 |
| 4,834,017 A | 5/1989 | Favetto et al. | ................... | 116/207 |
| 4,917,503 A | 4/1990 | Bhattacharjee | ................... | 374/102 |
| 5,045,283 A | 9/1991 | Patel | ................... | 422/56 |
| 5,053,339 A | 10/1991 | Patel | ................... | 436/2 |
| 5,058,088 A | 10/1991 | Haas et al. | ................... | 368/327 |
| 5,085,802 A | 2/1992 | Jalinski | ................... | 252/408.1 |
| 5,182,212 A | 1/1993 | Jalinski | ................... | 436/2 |
| 5,254,473 A | 10/1993 | Patel | ................... | 436/1 |
| 5,364,132 A | 11/1994 | Haas et al. | ................... | 283/67 |
| 5,407,732 A | 4/1995 | Dokurno | ................... | 428/213 |
| 5,446,705 A | 8/1995 | Haas et al. | ................... | 368/327 |
| 5,602,804 A | 2/1997 | Haas | ................... | 368/327 |
| 5,633,835 A | 5/1997 | Haas et al. | ................... | 368/327 |
| 5,662,976 A | 9/1997 | Popat et al. | ................... | 428/40.1 |
| 5,667,303 A | 9/1997 | Arens et al. | ................... | 374/102 |
| 5,672,465 A | 9/1997 | Patel et al. | ................... | 430/332 |
| 5,699,326 A | 12/1997 | Haas et al. | ................... | 368/327 |
| 5,715,215 A | 2/1998 | Haas et al. | ................... | 368/327 |
| 5,719,828 A | 2/1998 | Haas et al. | ................... | 368/327 |
| 5,756,356 A | 5/1998 | Yanagi et al. | ................... | 436/7 |
| 5,785,354 A | 7/1998 | Haas | ................... | 283/74 |
| 5,822,280 A | 10/1998 | Haas | ................... | 368/327 |
| 5,862,101 A | 1/1999 | Haas et al. | ................... | 368/327 |
| 5,873,606 A | 2/1999 | Haas et al. | ................... | 283/75 |
| 5,930,206 A | 7/1999 | Haas et al. | ................... | 368/327 |
| 5,957,458 A | 9/1999 | Haas et al. | ................... | 273/267 |
| 6,113,857 A | 9/2000 | Manico et al. | ................... | 422/61 |
| 6,214,623 B1 | 4/2001 | Simons et al. | ................... | 436/2 |
| 6,244,208 B1 | 6/2001 | Qiu et al. | ................... | 116/207 |
| 6,254,969 B1 | 7/2001 | Eberle | ................... | 428/195.1 |
| 6,295,252 B1 | 9/2001 | Holt et al. | ................... | 368/327 |
| 6,452,873 B1 | 9/2002 | Holt et al. | ................... | 368/327 |
| 6,614,728 B2 | 9/2003 | Spevacek | ................... | 368/327 |

FOREIGN PATENT DOCUMENTS

| | | |
|---|---|---|
| EP | 0 231 499 | 8/1987 |
| EP | 0 580 580 | 1/1993 |
| EP | 1 048 476 | 11/2000 |
| EP | 1 048 477 | 11/2000 |
| KR | 9309512 | 5/1991 |
| WO | 87/03367 | 6/1987 |
| WO | 92/05415 | 4/1992 |
| WO | 98/20337 | 5/1998 |
| WO | 98/39164 | 11/1998 |
| WO | 00/47964 | 8/2000 |

OTHER PUBLICATIONS

Eastman Chemical Company webpage (1 sheet) and MSDS (5 sheets) for EASTEK 1100 product, MSDS revision date Feb. 19, 1999.

* cited by examiner

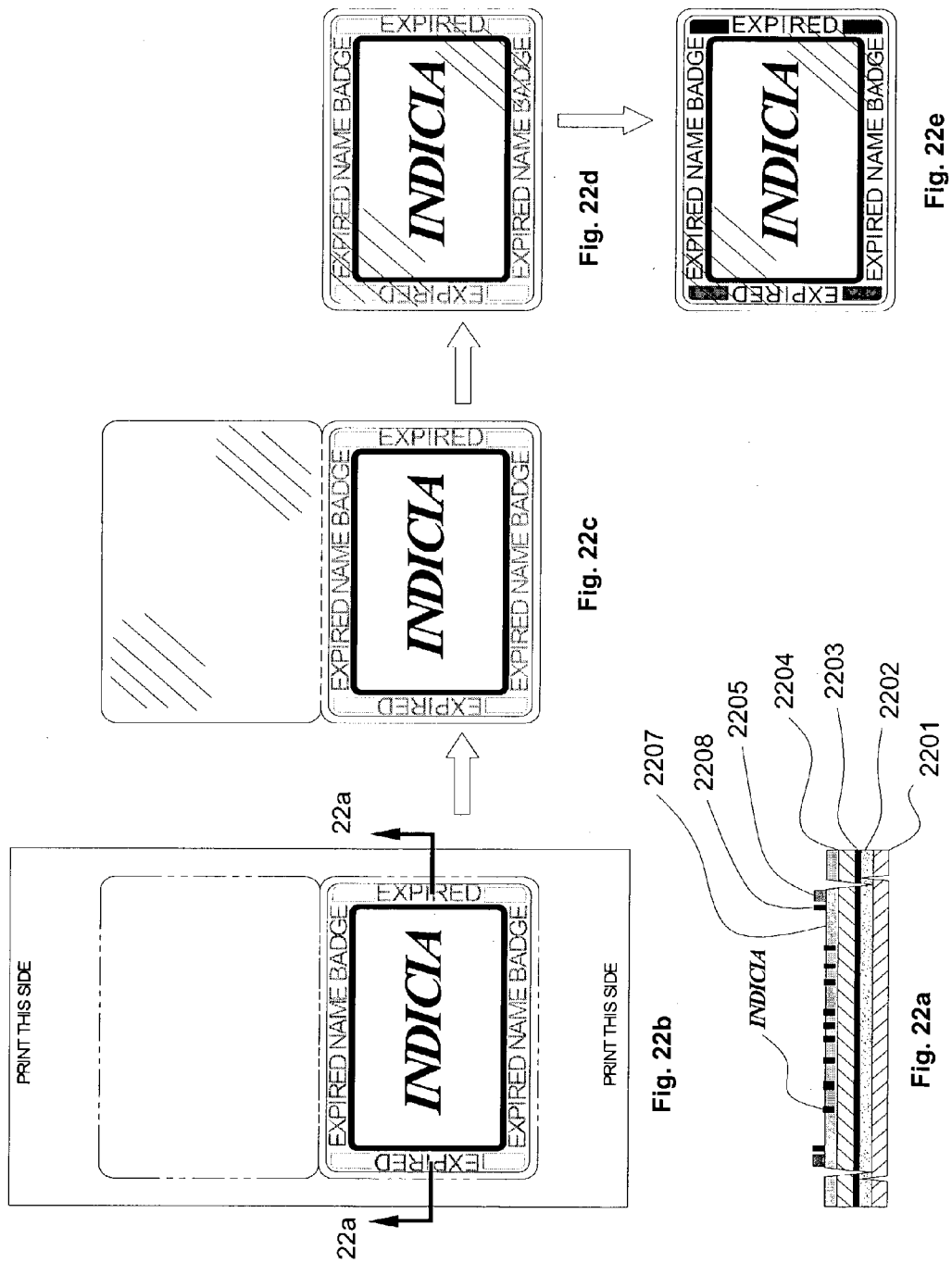

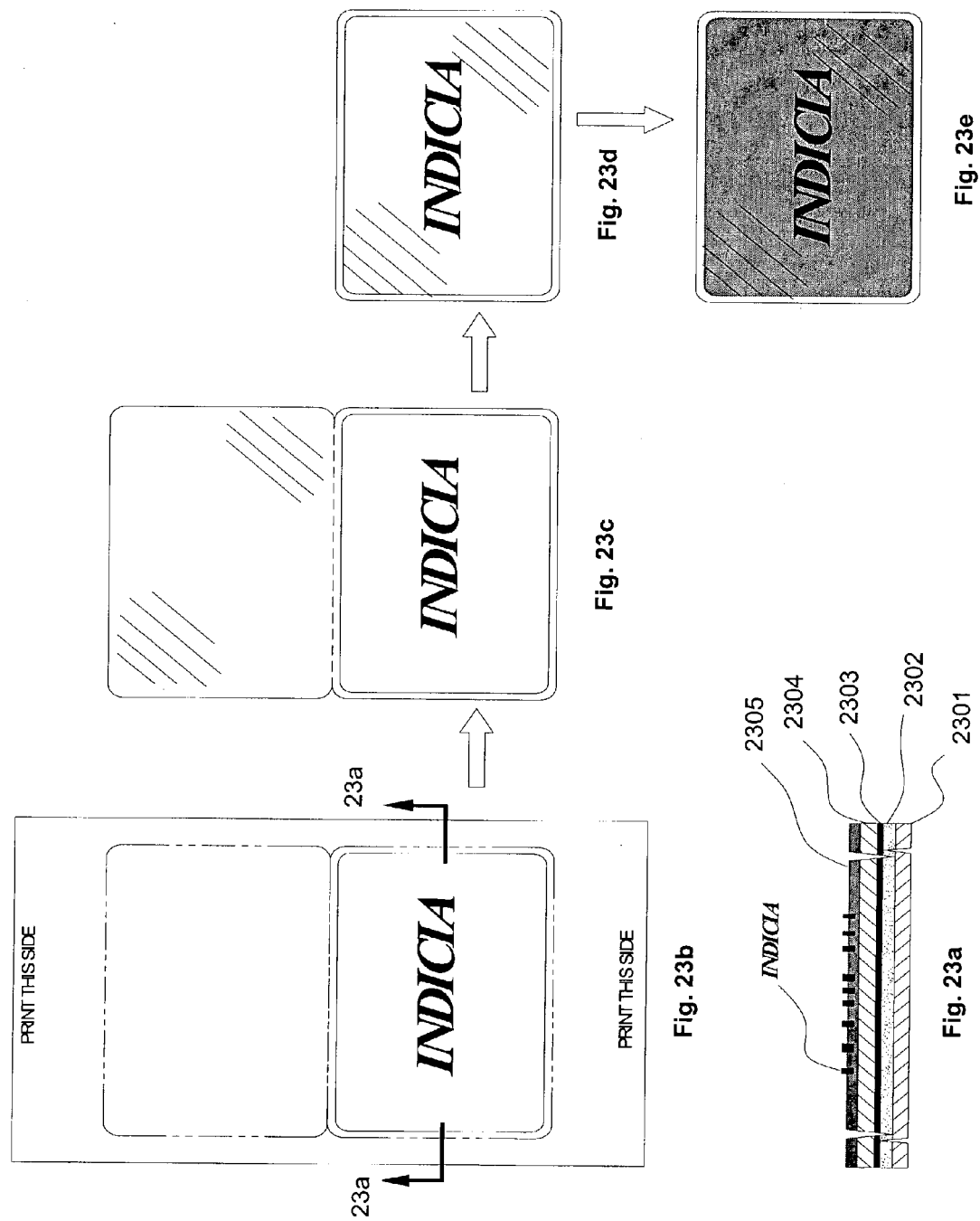

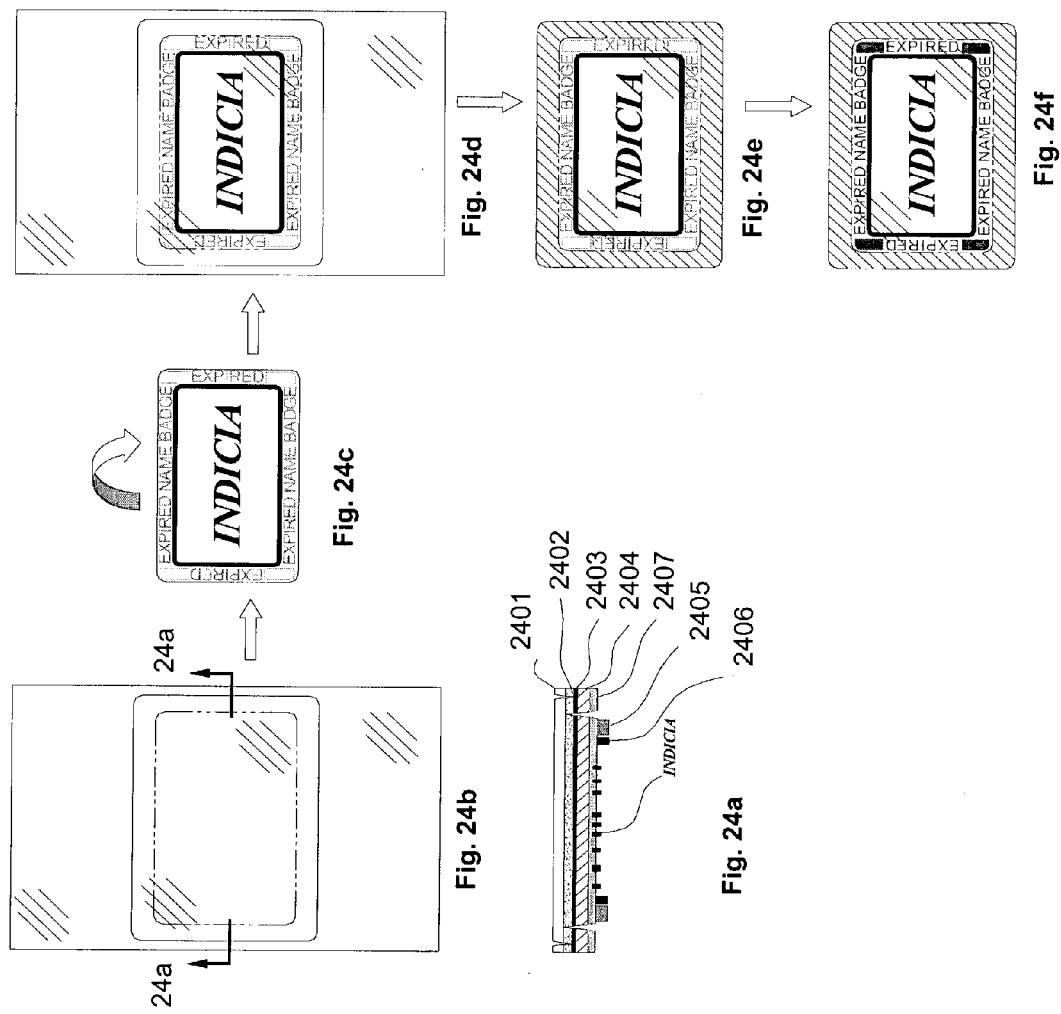

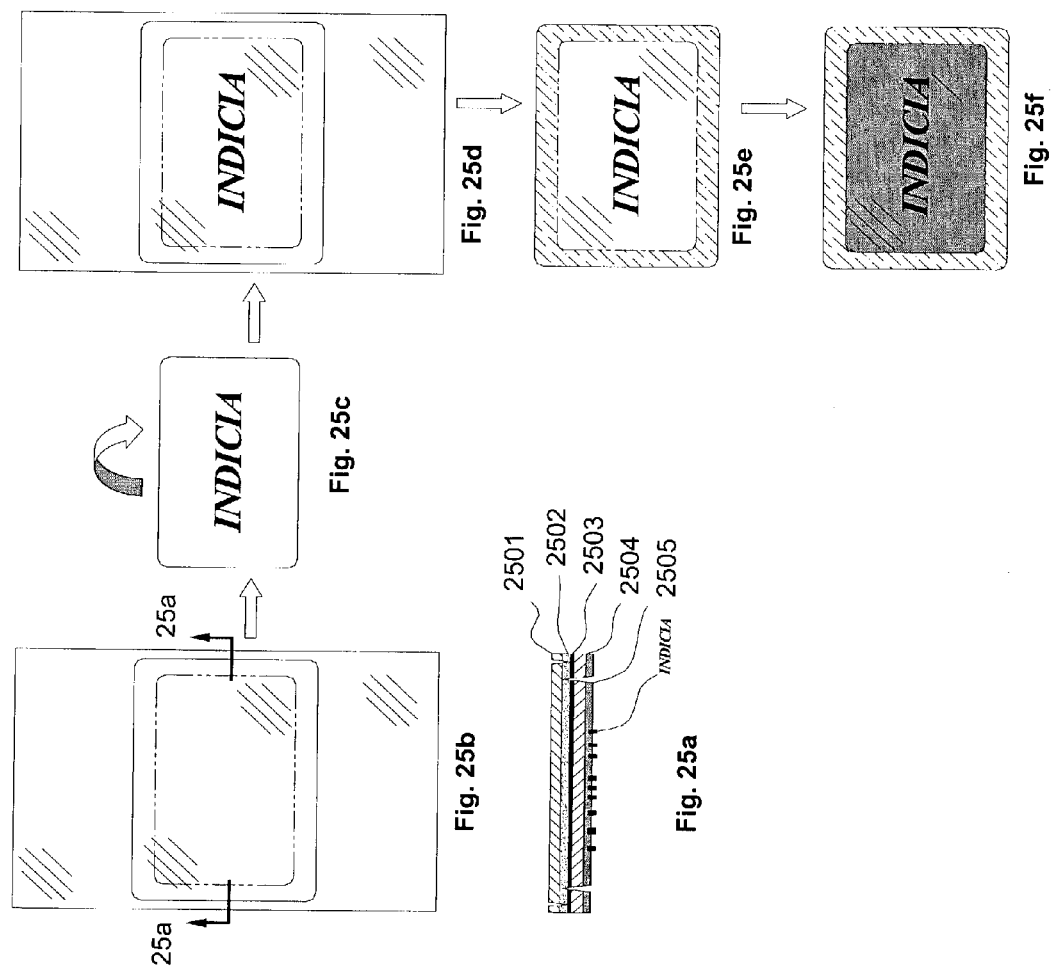

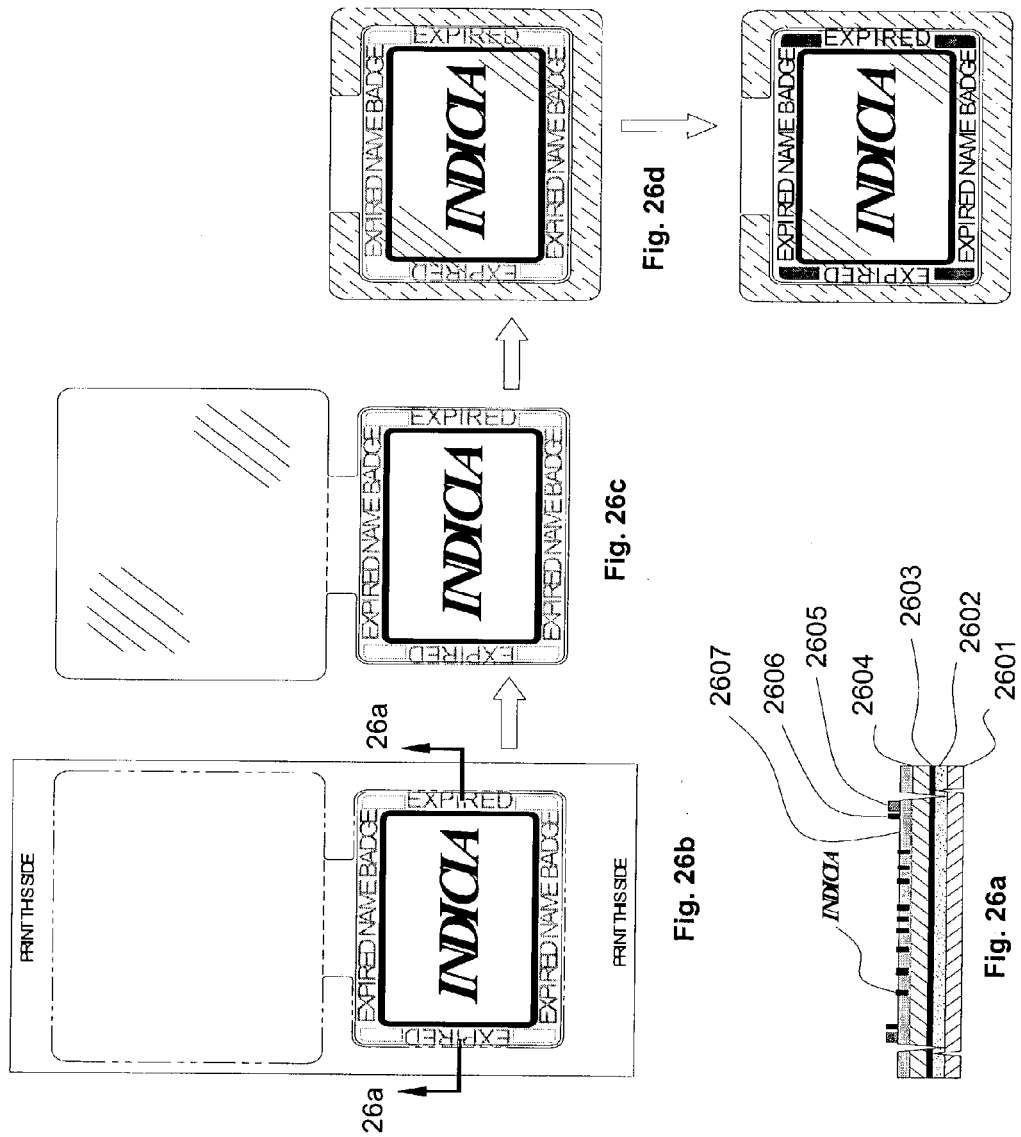

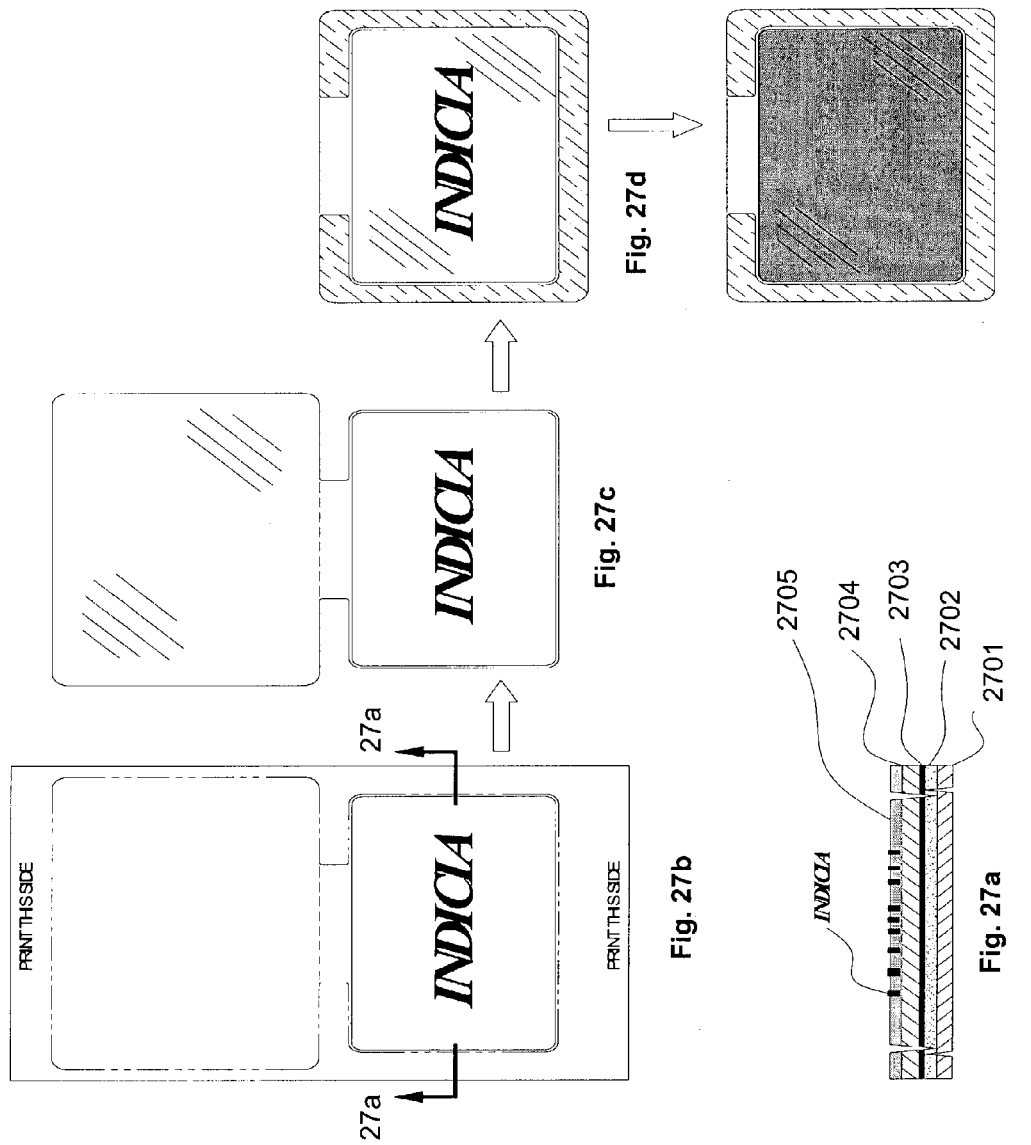

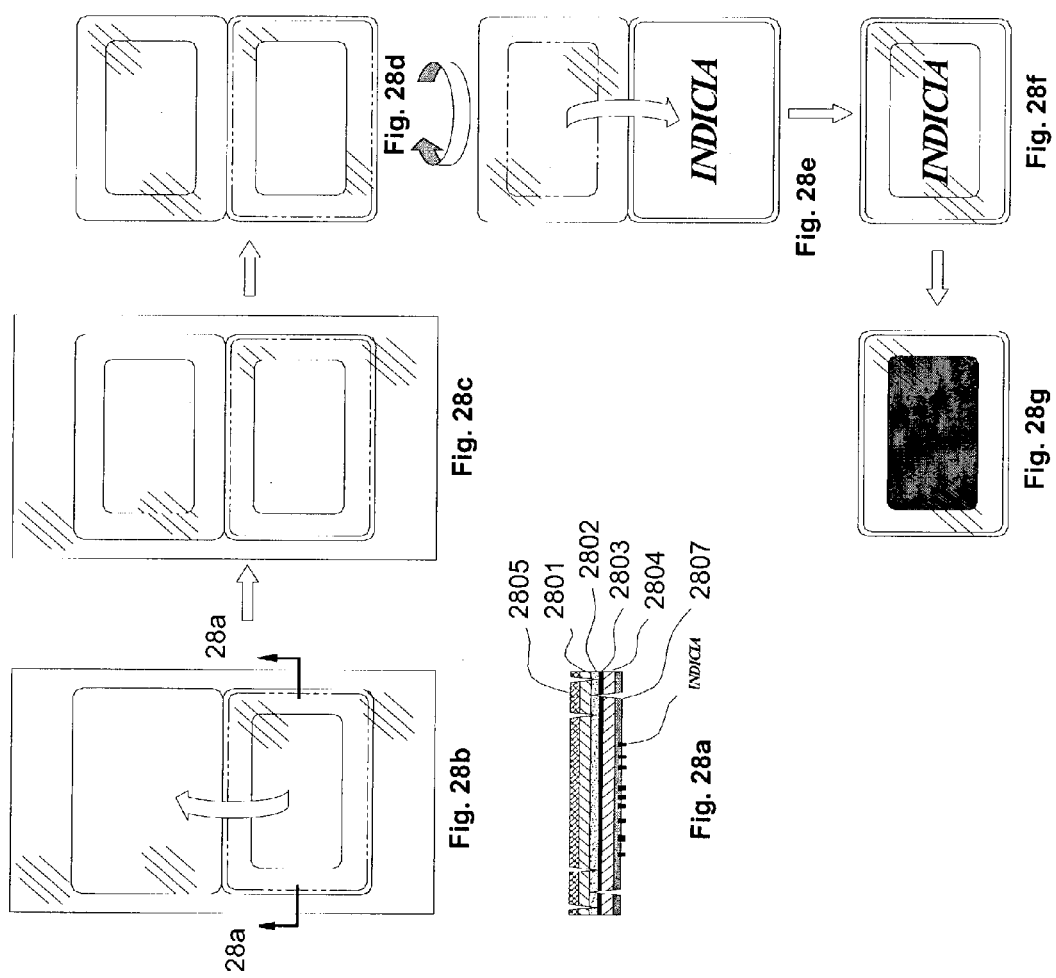

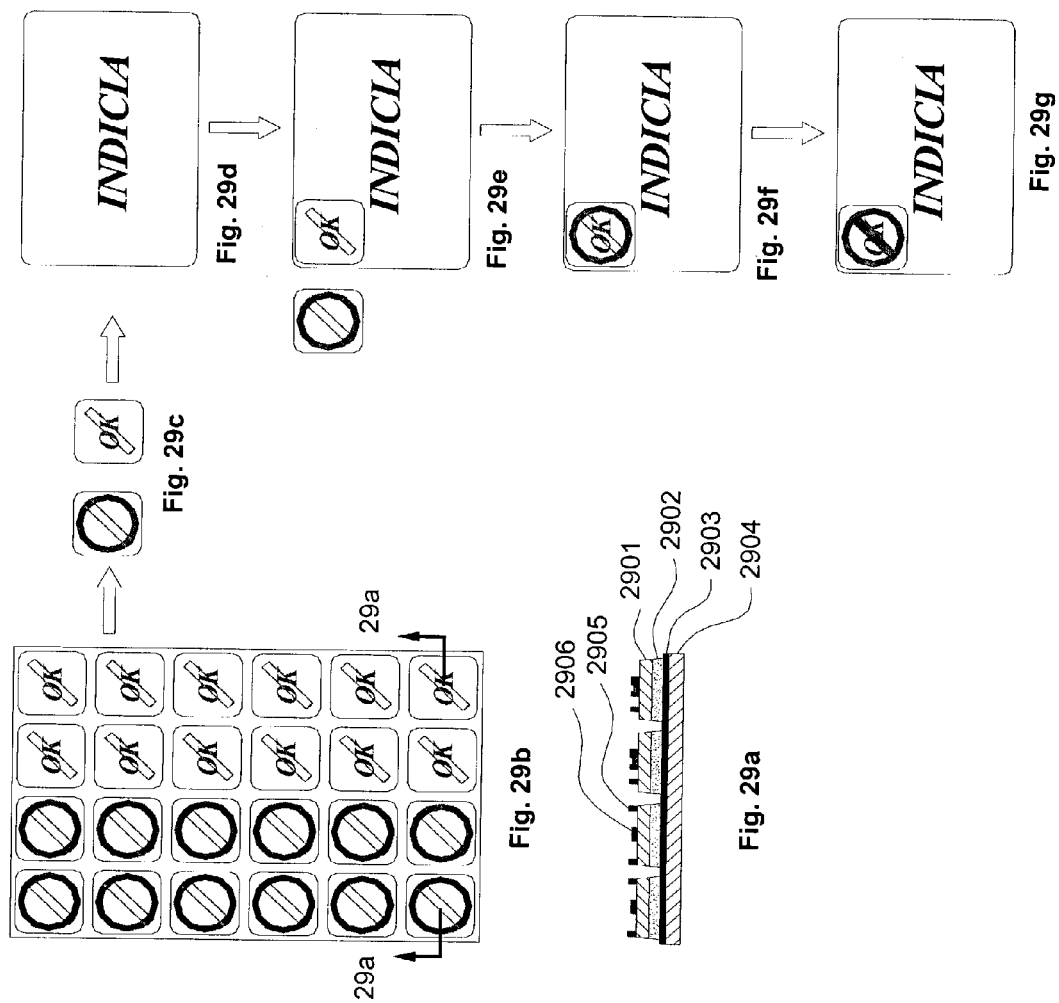

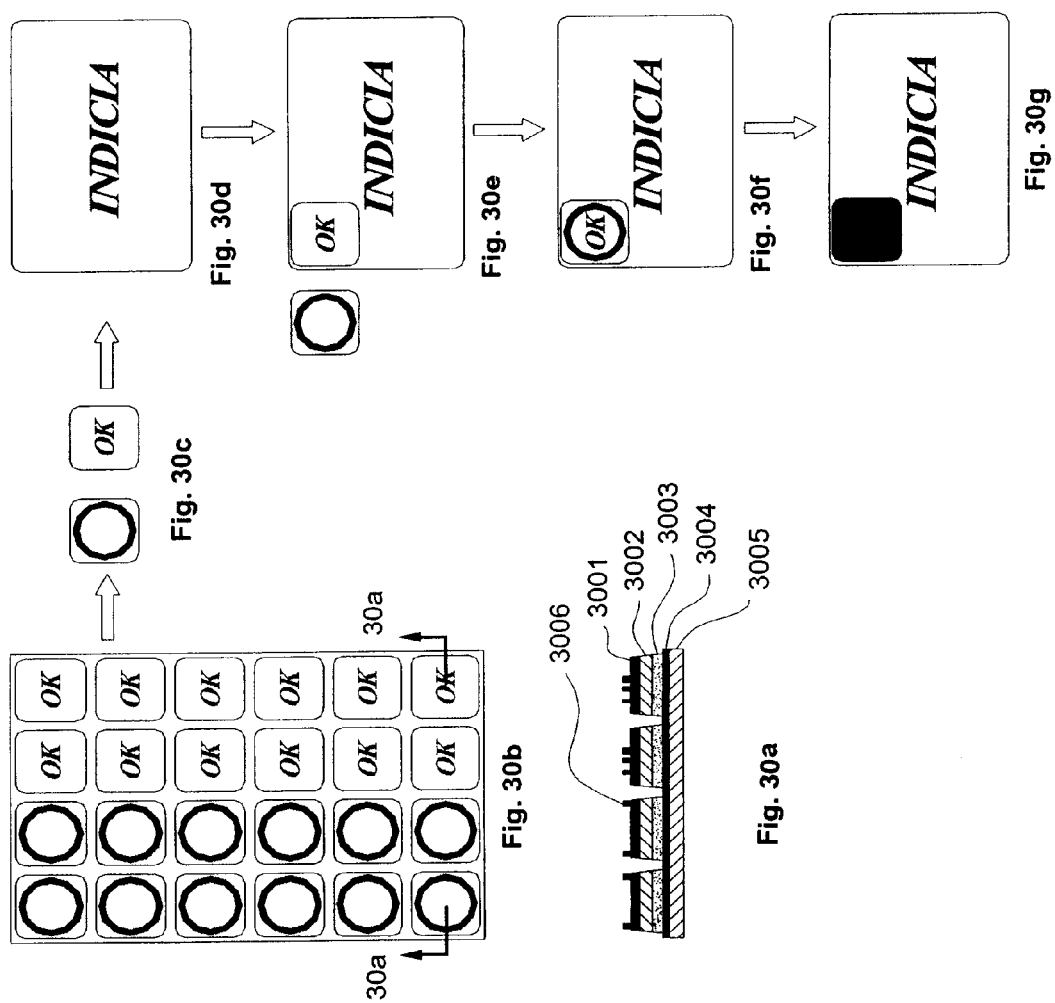

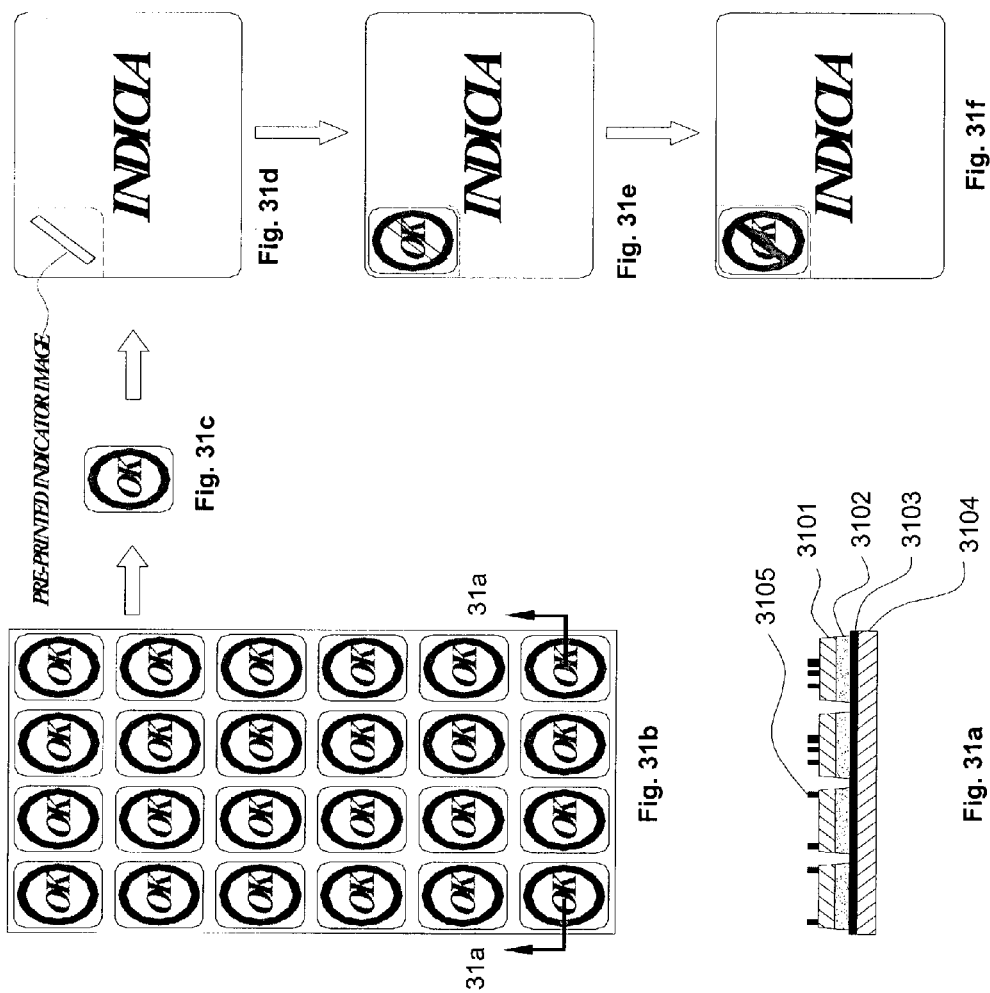

COLOR CHANGING DEVICE FOR TIME INDICATING LABEL AND METHODS OF MAKING AND USING THE SAME

CROSS REFERENCE TO RELATED APPLICATION

This application claims priority from provisional application No. 60/362,471 filed Mar. 7, 2002. The provisional application is hereby incorporated by reference in its entirety.

FIELD OF THE INVENTION

This invention relates to time and/or time-temperature indicating labels. More particularly, the time indicating labels include an activator and an acid-base indicator which change color based on time. The invention also relates to the preparation of time and/or time-temperature indicating labels and other devices using such indicating labels.

BACKGROUND OF THE INVENTION

Time and/or time-temperature indicating labels may be used in food manufacturing industries to identify food freshness. Time indicating labels may also be used where the label indicates a period of time has expired, such in visitor badge label.

It has long been known to manufacturers and distributors that the shelf life of perishable goods such as foodstuffs is a function of both the time and the temperature at which such goods are stored.

There is a need to monitor and indicate time-temperature exposure of food, so that both merchants and consumers can be assured the food has been stored and refrigerated properly prior to sale and/or use. It is well known that food degrades faster at higher temperatures than at lower temperatures, and that the time of exposure to such higher temperatures strongly relates to the degree of degradation resulting from such exposure.

Many manufacturers place expiration dates on food packaging in an attempt to provide an indication of the useful life of the foodstuff. However, these dates are based on an assumption that the foodstuff is stored under proper conditions, or at least within an estimated range of conditions. In addition, many manufacturers place "sell-by" dates, rather than expiration dates, on food packaging. Sell-by dates provide even less indication of the useful life of a foodstuff, since consumers may assume that the foodstuff remains useable for some time period following the sell-by date.

Both expiration and sell-by date indications break down if the foodstuff is exposed to temperatures higher than expected during the time period prior to the printed expiration or sell-by date. In such case, the food item may have been exposed to spoiling temperatures prior to the marked date, but the retailer or consumer would be misled into thinking the foodstuff was still acceptable. Thus, the need for a time-temperature indicating label has been long standing and continues.

To be useful, a time-temperature indicating label should provide its indication of expiration at approximately the same time as the food is expected to no longer be acceptable. Different foodstuffs have different tolerances for exposure to higher than normal temperatures. Thus, it is necessary to adjust the rate at which the time-temperature indicating label changes color or otherwise indicates that an unacceptable time or temperature has been reached. It is desirable to be able to make such adjustments while changing a minimum of the manufacturing parameters and while maintaining a consistent product, in appearance, usability and function.

A number of devices have been proposed for use as a time-temperature indicating label. However, many of these devices suffer from defects such as being unduly complicated or expensive to manufacture, or the device itself being subject to degradation over time and temperature exposure.

The present invention is intended to provide a solution to the long-standing problems of providing an indication of the exposure of foodstuffs to unacceptable time and/or temperature conditions.

Name badges have been constructed in many different ways for various purposes. One common concern is that a name badge could be re-used at a later date by an unauthorized user, granting them access to a site or specific locations within a site when it is not appropriate, creating a breech in security. One method of addressing this concern is through time indicating name badges, whereby some or all of the badge changes color within a set time period after activation in order to indicate that the badge has expired. Typically this color change occurs within 24 hours after it has been activated. Activation typically consists of creating an adhesive bond between two specially designed surfaces, allowing for either a gradual migration of (or a chemical reaction between) one or more elements within one or both of the surfaces to create the color change over time. All known prior art time sensitive name badges are provided with generic preformatted text (for example, the word "Visitor" printed across the top of the badge), and are designed to be hand-written. The current prior art cannot be run through any commonly available printers (for example laser or inkjet printers) in order to produce a more professional and customized appearance. The present invention is designed to provide time indicating badges that can be printed by the user in a commonly available (e.g., laser or inkjet) printer.

SUMMARY OF THE INVENTION

In one embodiment, the present invention relates to a time indicating label comprising (a) a label substrate having a first and second surface, (b) an acid-base indicator composition, and (c) an activator composition, wherein one of (b) or (c) are on the first surface of the substrate and wherein (b) and (c) when brought in contact remain adhered. The label may have a pressure sensitive adhesive on the second surface of the label.

In one embodiment, the invention relates to a time-temperature indicating label, comprising: (a) a label substrate having first and second surfaces; (b) an indicator composition containing an acid-base indicator capable of changing color, on a first area of the first surface; and (c) an activator composition on a second area of the first surface, wherein the first pressure sensitive adhesive and the polymeric material may be brought into an overlying relationship.

In another embodiment, the invention relates to a time-temperature indicating label, comprising: (a) a foldable label substrate having a first surface and a second surface; (b) an indicator composition containing an acid-base indicator capable of changing color on a first area of the first surface; (c) a polymeric material containing an activator compound capable of changing the color of the acid-base indicator on a second area of the first surface; and (d) a release liner on the first pressure sensitive adhesive.

In another embodiment, the invention relates to a method of determining the time-temperature history of an article, comprising: (a) providing a time-temperature indicating label, comprising: a label substrate having first and second surfaces; a first pressure sensitive adhesive containing an acid-base indicator capable of changing color, the first pressure sensitive adhesive on a first area of the first surface; and a polymeric material containing an activator compound capable of causing a color change in the acid-base indicator, the polymeric material on a second area of the first surface; (b) activating the time-temperature indicating label by bringing at least a portion of the first pressure sensitive adhesive into contact with at least a portion of the polymeric material; and (c) attaching the time-temperature indicating label to a substrate.

In another embodiment, the invention relates to a name badge comprising a printable substrate having a first and second surface, an acid-base indicator composition on the first surface of the substrate and an activator composition which is capable of adhering to the indicator composition.

In another embodiment, the invention relates to a method of providing name badges with a time limit, comprising the steps of providing an inkjet or laser printable substrate having a first and second surface and an acid-base indicator composition on the first surface, providing an activator composition, adhering the activator composition to the indicator composition wherein the indicator composition changes color to indicate that the name badge is expired.

Thus, the present invention provides a time indicating label which addresses and provides a solution to the problems of the prior art. The labels provide an effective means for determine the safety of frozen foods. The labels also provide a means of enhancing security by providing name badges that are time sensitive and may not be reused. The name badges provide a means to monitor the length of a visitor's time and prevent reusing the name badge.

BRIEF DESCRIPTION OF THE DRAWINGS

FIGS. 22a-e are a schematic cross-sectional view of a name badge and several steps in the assembling and activating the name badge.

FIGS. 23a-e are a schematic cross-sectional view of a name badge and several steps in the assembling and activating the name badge.

FIGS. 24a-f are a schematic cross-sectional view of a name badge and several steps in the assembling and activating the name badge.

FIGS. 25a-f are a schematic cross-sectional view of a name badge and several steps in the assembling and activating the name badge.

FIGS. 26a-e are a schematic cross-sectional view of a name badge and several steps in the assembling and activating the name badge.

FIGS. 27a-e are a schematic cross-sectional view of a name badge and several steps in the assembling and activating the name badge.

FIGS. 28a-g are a schematic cross-sectional view of a name badge and several steps in the assembling and activating the name badge.

FIGS. 29a-g are a schematic cross-sectional view of a name badge and several steps in the assembling and activating the name badge.

FIGS. 30a-g are a schematic cross-sectional view of a name badge and several steps in the assembling and activating the name badge.

FIGS. 31a-f are a schematic cross-sectional view of a name badge and several steps in the assembling and activating the name badge.

Figure 1:
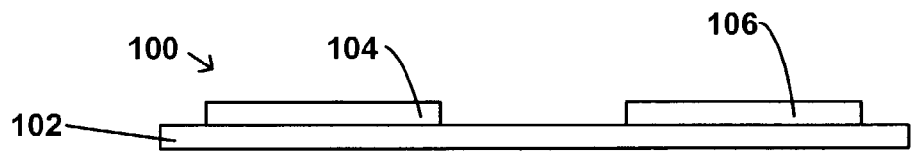
FIG. 1 is a schematic cross-sectional view of a first embodiment of the time-temperature indicating label, in accordance with the present invention.

It should be appreciated that for simplicity and clarity of illustration, elements shown in the Figures have not necessarily been drawn to scale. For example, the dimensions of some of the elements may be exaggerated relative to each other for clarity. Further, where considered appropriate, reference numerals have been repeated among the Figures to indicate corresponding elements.

It should be appreciated that the process steps and structures described below do not form a complete process flow for manufacturing a complete time indicator or time-temperature indicator. The present invention can be practiced in conjunction with fabrication techniques currently used in the art, and only so much of the commonly practiced process steps are included as are necessary for an understanding of the present invention.

DETAILED DESCRIPTION

The term "overlies" and cognate terms such as overlying and the like refers to the fact that one of the layers covers at least a portion of the other layer. The layer overlying the other layer may or may not be in direct contact with the other layer. For example, one or more additional layers may be positioned between the layers. Similarly, the term "underlies" and cognate terms such as "underlying" and the like refers to the situation where at least one portion of one layer is covered by the other layer.

The term "transparent layer" refers to a layer through which color, ink or printing may be seen.

As used herein, the term "first pressure sensitive adhesive" is sometimes used as illustrative of the indicator composition, and the term "polymeric material" is sometimes used as illustrative of the actuator composition. It is understood that the other carrier materials discussed herein may still be used in place of the first pressure sensitive adhesive or the polymeric material. These terms are used as illustrative, non-limiting examples.

As described herein, the time and/or time-temperature indicator comprises a label substrate, an acid-base indicator composition, and an activator composition. When brought into contact that indicator composition and the activator remained adhered. In one embodiment, one or both layers have adhesive qualities. In another embodiment, the layers are adhered through another coating of an adhesive.

The indicator and activator compositions may be provided as individual structures that are placed together, such as two constructions with a substrate supporting each of the compositions. As another embodiment, the indicator and the activator may be provided on the same substrate. In this embodiment, the substrate is flexible or articulated to bring the indicator and the activator into at least a partial overlying relationship.

The areas of the indicator and activator compositions are such that they may be positioned and sized so that one layer completely covers a majority or completely covers the other layer. Typically, the covering layer will be the layer with the activator.

In the time and/or time-temperature indicating labels and methods, the acid-base indicator changes color by the action of the migration of the activator compound. The migration of the activator compound is determined by the time the indicator is exposed to certain temperatures. When the color change is visible, then the material to which the indicator is attached, such as food, should not be used. Hereinafter, when reference to the "time indicator" or "time indicating label" is used, it should be understood that such refers to both time and time-temperature indicators or indicating labels, unless one is specifically identified.

Label Substrates

As described above, the time temperature indicator has a label substrate having a first and second side. The label substrate may be clear, or opaque. The substrate is flexible enough to bend and have the area of the indicator composition come into contact with the activator composition. In one embodiment, the color change is visible through the label substrate. In one embodiment, the label substrate is substantially transparent. That is, the color change can be observed through the label substrate. In one embodiment, the label substrate is clear, colorless and completely transparent. The substrates may have one or more coatings to improve ink adhesion. In one embodiment, the papers are coated with topcoats to improve inkjet ink adhesion. These papers are known and available to those skilled in the art.

The label substrate may be any sheet or film capable of bending as described above. In one embodiment, the label substrate may be any film intended for use as label facestock or tape. This label substrate can be a polymer film, paper sheet, or combination thereof. The color change in the acid-base indicator caused by the activator can be observed through the label substrate. When used as a label, the face side may have a printed or a printable surface. This label substrate can be a single-layered sheet or film or it can be a multi-layered construction. These include polymer films and multi-layered polymer films. The multi-layered constructions and polymer films have two or more layers, or about two to about seven layers, or about three to about five layers. The layers of such multi-layered constructions and polymer films can have the same composition and/or size or they can be different. The label substrate can have any thickness that is suitable for sheets or films intended for use as labels or tapes, with thicknesses in the range from about 0.3 to about 20 (about 8 to about 500 microns), or from about 0.3 to about 10 mils (about 8 to about 250 microns), or from about 0.5 to about 5 mils (about 12 to about 125 microns), or from about 1 to about 4 mils (about 25 to about 100 microns). Here and elsewhere in the specification and claims, the range and ratio limits may be combined.

The polymer films include polyolefins (linear or branched), polyamides, polystyrenes, nylon, polyesters, polyester copolymers, polyurethanes, polysulfones, polyvinylidine chloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are the acrylate copolymers such as ethylene methacrylic acid, ethylene methyl acrylate, ethylene acrylic acid and ethylene ethyl acrylate copolymers. Also, included in this group are polymers and copolymers of olefin monomers having from 2 to about 12, or from 2 to about 8 carbon atoms. These include the polymers of alpha-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule.

The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.940 to about 0.965 g/cm$^3$. Films prepared from blends of copolymers or blends of copolymers with homopolymers also are useful.

In one embodiment, the label substrate is a paper or card stock substrate. The paper label substrates include paper and glassine, and any other paper. The paper may include paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semichemical processes, etc, so long as these papers are substantially transparent. Although paper of any basis weight can be employed, paper having basis weights in the range from about 10 to about 50 pounds per ream (lb/ream) are useful. In one embodiment, papers having weights in the range of from about 20 to about 40 lb/ream may be used.

The label substrate can be a polymer-coated paper which is basically comprised of a sheet of paper that is coated on either one or both sides with a polymer coating, so long as the label substrate is substantially transparent. The polymer coating, which can be comprised of a high, medium, or low density polyethylene, polypropylene, polyester, and other similar polymer films, is coated onto the label substrate surface to add strength and/or dimensional stability. The weight of these types of coated paper label substrates can vary over a wide range with weights in the range of about 10 to about 50 lb/ream being useful. In total, the final coated paper label substrate may be comprised of between about 10% and about 40% by weight polymer. For two-sided coatings, the quantity of polymer is approximately evenly divided between the top or face side and the bottom or underside of the paper.

Carriers

The substrates may have either an acid-base indicator composition or an activator composition on one or more of its surfaces. These compositions comprise an acid-base indicator compound or an activator compound and a carrier. The carriers are generally applied by coating or printing technologies, such as flexo printing. The carriers may include polymeric materials, inks, varnishes and pressure sensitive adhesives.

In one embodiment, the carrier may be an ink such as water-based, solvent-based or a radiation-curable ink appropriately chosen for the particular construction of the film structure of the present invention, and/or the particular printing method utilized. Specific examples of inks which can be utilized as a non-adhesive or detackifier material in the present invention include Sun Sheen (a product of Sun Chemical Company identified as an alcohol dilutable polyamide ink), Suntex MP (a product of Sun Chemical Company identified as a solvent-based ink formulated for surface printing acrylic coated substrates, PVIDC coated substrates and polyolefin films), X-CEL (a product of Water Ink Technologies identified as a water-based film ink for printing film substrates), Uvilith AR-109 Rubine Red (a product of Daw Ink identified as a UV ink) and CLA 91 598F (a product of Sun Chemical identified as a multibond black solvent-based ink). An example of a useful solvent based ink is No-Tox Liquid Ink FGN 41 21 and an example of a useful water based ink is No-Tox Liquid Ink FGN 3359, both of which are available from Colorcon, a division of Berwind Pharmaceutical Services, West Point, Pa. The FGN 3359 ink is believed to contain styrene-acrylic polymers.

In another embodiment, the carrier may be solvent-based or water-based varnish. The varnish may be typically comprised of one or more organic polymers or copolymers such as polyolefins, polyamides, polyesters, polyester copolymers, polyurethanes, polysulfones, polyvinylidene chloride, styrene-maleic anhydride copolymers, styrene-acrylonitrile copolymers, ionomers based on sodium or zinc salts of ethylene methacrylic acid, polymethyl methacrylates, acrylic polymers and copolymers, cellulosic polymers, acetate polymers, polyvinyl chlorides, polycarbonates, polyacrylonitriles, ethylene-vinyl acetate copolymers, and mixtures of two or more thereof dissolved or dispersed in a diluent. Examples of the diluents that can be used include alcohols such as ethanol, isopropanol butanol; esters such as ethyl acetate, propyl acetate, butyl acetate; toluene, xylene; ketones such as acetone, methyl ethyl ketone, mineral spirits and mixtures thereof. The ratio of polymer to diluent is dependent on the viscosity required for the application of the carrier, and the selection of such viscosity is within the skill of the art. Example of varnishes that can be used as carrier materials include CLBO 4275F-Prokote Primer (a product of Sun Chemical Corporation identified as a solvent based primer useful with inks and coatings). The carriers utilized in the present invention typically have a thick coating weight of from about 1 to about 5 gsm (grams per square meter) or from about 1 to about 2 gsm.

In one embodiment, the varnish is a UV-curable varnish. Nonlimiting examples of UV-curable varnishes include Envirocure UV-1801, available from Environmental Ink and Coating Corp. (Morgantown, N.C.), and Clear Coating RCA 01291R, available from Sun Chemical (Rochester, N.Y.). An example of a clear UV-cured acrylic varnish currently available under the designation Flexographic UV Curable Varnish, UVF 02037, is available from Akzo Nobel Inks Corp., Langhorne, Pa. Envirocure UV-1801 is non-yellowing, offers good flexibility and resistance to cracking, provides rapid cure response, and provides good scuff resistance. Clear Coating RCA 01291 R is light- and temperature-stable and exhibits high gloss and lay, with excellent adhesion. The varnish can be applied as a liquid and then cured with ultraviolet light. In one embodiment, the varnish is applied at a coat weight (measured after drying) of from about 1 to about 5 gsm, or from about 2.5 to about 4.5 gsm. Alternatively, a thin layer (approximately 0.5 gsm) of silicone is used in place of the UV-curable varnish layer.

A suitable UV-curable varnish for the second layer is available as product code Clear Coating RCA 01291 R from Sun Chemical of Rochester, N.Y. This particular product exhibits high gloss and layflatness with excellent release properties when coated on the upper exposed face surface of the first UV-curable varnish layer. The coating is very stable with respect to light and temperature. Ultraviolet curable matte varnishes useful for forming this varnish layer are available from the Dunmore Corp., Newtown, Pa. Polyethylene terephthalate films coated with a solvent-based gravure imprintable top varnish useful in preparing the labels of this invention also are available from the Dunmore Corp.

It should be noted that alternatives to UV-curable varnishes include water-based varnishes, solvent-based varnishes, or other varnishes, such as hot melt varnishes. Suitable water-based varnishes are Film III C Extender Varnish, Film III C Opaque White and Aqua Gloss Film OPV available from Environmental Inks & Coatings. A suitable solvent-based varnish is Flexotuf Extending Varnish available from Sun Chemical. Water- and solvent-based varnishes and inks can be applied utilizing flexographic, gravure and screen ink printing techniques or in some instances, print rolls.

As described above, a carrier may be a pressure sensitive adhesive. The pressure sensitive adhesive is present in an amount from about 5 to about 45, or from about 7 to about 30 or to about 9 to about 25 grams per square meter (gsm or $g/m^2$). The pressure sensitive adhesive contains at least one acid-base indicator or at least one activator. If should be noted that pressure sensitive adhesives are used in a number of the embodiments of the present invention. Any one of the pressure sensitive adhesive described herein may be used where the invention calls for a pressure sensitive adhesive.

As disclosed herein, the acid-base indicator may be in either the carrier layers, and the activator compound may be in either of the carrier layers.

The pressure sensitive adhesive may be comprised of any pressure-sensitive or heat-activatable adhesive material known in the art for making labels, tapes and the like. The pressure sensitive adhesive must be able to adhere to the surface of the polymeric material or a layer covering the polymeric material. The adhesives include rubber based adhesives, acrylic adhesives, vinyl ether adhesives, silicone adhesives, and mixtures of two or more thereof. The pressure sensitive adhesives can be in the form of hot melt, solution or emulsion adhesives. Included are the pressure sensitive or heat-activatable adhesive materials described in "Adhesion and Bonding", Encyclopedia of Polymer Science and Engineering, Vol. 1, pages 476-546, Interscience Publishers, 2nd Ed. 1985, the disclosure of which is hereby incorporated by reference. The pressure sensitive or heat-activatable adhesive materials that are useful may contain as a major constituent an adhesive polymer, such as acrylic-type polymers; block copolymers; natural, reclaimed, or styrene-butadiene rubbers; tackified natural or synthetic rubbers; or random copolymers of ethylene and vinyl acetate, ethylene-vinyl-acrylic terpolymers, polyisobutylene, poly(vinyl ether), etc.

Other materials in addition to the foregoing resins may be included in the pressure sensitive or heat-activatable adhesive compositions. These include solid tackifying resins, antioxidants, fillers, pigments, waxes, etc. Also included are plasticizers (often referred to as liquid tackifiers), including phthalate esters and phosphate esters. Many plasticizers are described which are used in the label substrate. These plasticizers may be used in the pressure sensitive adhesive. The adhesive compositions may contain various oil components such as paraffinic or aromatic oil. Naphthenic oil may present in the adhesive.

In one embodiment, the pressure sensitive adhesives are polyacrylate or polymethacrylate pressure sensitive adhesives. The polymers generally have a glass transition temperature of less than about 10° C., or less than about 0° C., or less than about −15° C. The polymers typically have a weight average molecular weight of at least about 200,000, or from about 200,000 to about 700,000. The weight average molecular weight may be determined by size exclusion chromatography using polystyrene for calibration. Polymers of the instant invention may be synthesized by solution, emulsion or bulk polymerization. Polymers may be cross-linked to the desired extent, prior to use, using heat, ionic additives, catalysts, actinic or electron beam radiation and the like.

The acrylate or methacrylate esters include those having from about 1 to about 24, or from about 2 to about 18, or from about 4 to about 16 carbon atoms in the ester group. The alkyl acrylate and methacrylate esters include without limitation 2-ethyl hexyl acrylate, isooctyl acrylate, butyl acrylate, sec-butyl acrylate, methyl butyl acrylate, 4-methyl-2-pentyl acrylate, isodecyl methacrylate, octadecyl acrylate (ODA), lauryl acrylate (LA), propyl acrylate (PA), ethyl acrylate (EA), ethylmethacrylate (EMA), propylmethacrylate (PMA), 3,3,5 trimethylcyclohexyl acrylate (TMCA), iso-bornyl acrylate (IBA), cyclohexyl acrylate (CHA), N-octyl acrylamide (NOA), other N-alkyl acrylamides, tetrahydrofurfuryl acrylate (THFA), methyl acrylate (MA), 2-phenoxyethylacrylate (2-PhEA) and their hydroxy substituted analogs, and mixtures thereof. In some embodiments, isooctyl acrylate and 2-ethyl hexyl acrylate are particularly useful.

In one embodiment, the adhesives are polymers of an acrylate or methacrylate ester, a nitrogen containing monomer, an unsaturated carboxylic acid, and optionally a monomer containing cross-linkable site. The acrylate esters or methacrylate esters are generally present in a major amount, e.g., greater than 50%. Typically the acrylate or methacrylate ester is present in an amount from about 55% to about 90%, or from about 60% to about 85%, or from about 65% to about 80% by weight.

The nitrogen containing monomers include N-vinyl lactams. Examples of useful nitrogen containing monomers are N-vinyl pyrrolidone (NVP), N-vinyl caprolactam (NVC), N,N,-dimethylacrylamide (DMA), 1-vinyl-2-piperidone, 1-vinyl-5-methyl-2-pyrrolidone, and the like. N-vinyl pyrrolidone is particularly useful. The level of nitrogen containing monomer is generally from 10% to about 30%, or from about 8% to about 16%, or from about 10% to about 14% by weight. In one embodiment, the total level of nitrogen containing monomer is from about 15% to about 25%, or from about 10% to about 15%, or from about 11% to about 13% by weight.

In one embodiment, the pressure adhesive is prepared in the presence of an unsaturated carboxylic acid. The unsaturated carboxylic acids include acrylic acid, methacrylic acid, fumaric acid, maleic acid or anhydride, allyl acid, or mixtures thereof. The unsaturated carboxylic acid is generally present in an amount from 0.5% to about 20%, or from about 2% to about 15%, or from about 4% to about 10% by weight.

In one embodiment, the pressure sensitive adhesive is prepared with a glycidyl monomer. The glycidyl monomer include epoxy acrylate or methacrylate esters, and glycidyl allyl esters, for example glycidyl acrylate (GA) and glycidyl methacrylate (GMA). The glycidyl monomers are present in an amount from 0% to about 3%, or from about 0.3% to about 2%, or from about 0.5% to about 1% by weight. In one embodiment, the glycidyl monomer is present in an amount of less than about 0.5%, or less than about 0.3%, or less than about 0.2% by weight. In this embodiment, the glycidyl monomer is present at a level of at least about 0.01% by weight.

In one embodiment, the polymers include at least one alkyl acrylate and methacrylate ester containing less than 4 carbon atoms in the alkyl group. Examples of these monomers include methyl acrylate, ethyl acrylate, methyl methacrylate, ethyl methacrylate and the like. Methyl acrylate is particularly preferred. These monomers are present in an amount from about 0% to about 42%, or from about 5% to about 30%, from about 10% to about 25% by weight, from about 30% to about 40% by weight.

In one embodiment, the pressure sensitive adhesives are copolymers made from monomers including the foregoing monomers copolymerized with a sulfonic acid containing ethylenically polymerizable monomer. In one embodiment, the sulfonic acid containing monomer includes both a sulfonic acid moiety and an acryl or methacryl moiety. In one embodiment, the sulfonic acid containing monomer includes both a sulfonic acid moiety and an acrylamide or a methacrylamide moiety. In one embodiment, the sulfonic acid containing monomer is 2-acrylamido-2-methyl-1-propanesulfonic acid (AMMPAS). The presence of the sulfonic acid moiety provides to the pressure sensitive adhesive beneficial effects in the low-energy adhesion and in withstanding extended exposure to cold temperatures.

The pressure sensitive adhesive may include other co-polymerizable monomers. Typically these monomers are present in an amount from about 0% to about 33%, or from about 1% to about 20%, or from about 3% to about 15% by weight. These other monomers are selected to provide the desired glass transition temperature for the polymer. Other monomers include polystyryl ethyl methacrylate, acetoacetoxy ethyl methacrylate, alpha olefins (e.g. $C_{2-8}$ alpha-olefins), such as ethylene, propylene and butylene, and vinyl esters of alkanoic acids containing more than three carbon atoms, and monomers such as vinyl acetate and styrene.

The pressure sensitive adhesives may be emulsion based. The emulsion based pressure sensitive adhesives useful in the instant invention are based on polymers which contain, on a percent by weight basis, from about 95% to about 97.5% by weight total of at least one alkyl ester of acrylic acid containing about 1 to about 10 carbon atoms in the alkyl group. Useful alkyl acrylates include n-butyl acrylate, 2-ethyl hexyl acrylate, isooctyl acrylate and the like. In one embodiment, the alkyl acrylate is butyl acrylate. In another embodiment, the alkyl acrylate is 2-ethyl hexyl acrylate. In another embodiment, the alkyl acrylate is a mixture of butyl acrylate and 2-ethyl hexyl acrylate.

The second monomeric component in the emulsion pressure sensitive adhesive may be a mixture of $\alpha,\beta$-unsaturated carboxylic acids present in a total amount of at least about 2.5% by weight, and in one embodiment from about 2.5% to about 5% by weight. The unsaturated carboxylic acid may contain from about 3 to about 5 carbon atoms and may include, among others, acrylic acid, methacrylic acid, itaconic acid and the like. In one embodiment, the unsaturated carboxylic acid includes a mixture of acrylic acid and methacrylic acid. In one embodiment, the mixture includes a respective weight ratio of about 1:1 to about 1:3, and in another embodiment a respective weight ratio from about 1:1 to about 1:2, of acrylic to methacrylic acid.

In one embodiment, the emulsion pressure sensitive adhesives may have a glass transition temperature of less than about −10° C., and in one embodiment, less than about −30° C.

In one embodiment, the emulsion pressure sensitive adhesives may include an anionic surfactant in an amount up to about 2.5% by weight of the total emulsion pressure sensitive adhesive and surfactant mixture. Suitable anionic surfactants include sodium alkyl sulfates, sodium alkyl ether sulfates, sodium dialkyl sulfosuccinates, and similar anionic surfactants.

In one embodiment, the emulsion pressure sensitive adhesives may further include known additives such as tackifiers.

The pressure sensitive adhesives of the present invention exhibit good adhesion to low-energy surfaces such as polyethylene, polypropylene, vinyl chloride/vinylidene chloride copolymers (e.g., Saran), waxed paper, polymers containing surfactants which may migrate to the surface, and other low energy surfaces in materials commonly used for food packaging. These adhesives and blends therewith help retain the adhesive performance, e.g., required for superior performance on low energy surfaces, without compromising either the cohesive strength (important for long term removability properties) or cold temperature properties. The adhesive composition is particularly well suited for use with films like PVC that are known to often contain additives, such as plasticizers, which are capable of compromising adhesive performances. Blends of appropriate adhesive formulations, however, help overcome the cold temperature deficiency of high NVP polymers while still maintaining good aged cold performance and long term removability characteristics.

In one embodiment, the pressure-sensitive adhesive polymers of the present invention are prepared by co-polymerizing a mixture of monomers comprising from about 55% to about 85% by weight of an alkyl acrylate and/or methacrylate ester containing 4 to about 12 carbon atoms in the alkyl group; from about 0 to about 1% by weight of a glycidyl monomer; from about 10 to about 30% by weight, or from 10 to about 15% by weight of a nitrogen monomer; from 0.5% to 15% by weight, or from about 5 to about 15% by weight of an unsaturated carboxylic acid, or from about 3 to about 8% by weight; from about 0 to about 30% by weight of a sulfonic acid-containing ethylenically polymerizable monomer; from 0 to about 30% by weight of an alkyl acrylate and/or methacrylate ester containing less than 4 carbon atoms in the alkyl group, most preferably from about 12 to about 22% by weight, and optionally from about 0 to 33% by weight of one or more other comonomers to provide a balance of desirable polymer properties such as glass transition temperature.

The copolymers may be synthesized using solution, emulsion, or bulk polymerization techniques. In one embodiment, the copolymers are prepared in solution using a mixture of solvents and/or as an emulsion. The solution polymerization involves the use of blends of ethyl acetate and ethyl alcohol. In one embodiment, the ratio of ethyl acetate to ethyl alcohol is 36:24. The ratio of solvents is adjusted to provide a reflux temperature from about 68° C. to about 78° C. The solids content during polymerization may typically range from about 30% to about 60% in order to achieve the desired weight average molecular weight, and yet achieve viscosities that are manageable in the reactor. The reaction occurs in the presence of free-radical initiators, preferably of the azo type, for example, 2,2'-azobisisobutyronitrile (AIBN). The polymers formed are solvent soluble polymers. In one embodiment, the glycidyl monomer is limited to 1% by weight of the total monomers to avoid the possibility of cross-linking, by opening of the oxirane group, during polymerization or during aging. Polymers can, as desired, be post-polymerization cross-linked using heat, catalysts, actinic or electron beam radiation and the like. The adhesive properties can, further be, manipulated and modified by additions of additives such as tackifiers, plasticizers, etc.

The following examples relate to the polymers of the present invention. Unless otherwise indicated here or throughout the specification and claims, the range and ratio limits are by weight, the temperature is room temperature in degrees Celsius and the pressure is atmospheric pressure.

EXAMPLE A-1

Example A-1 provides examples of the preparation of acrylic emulsion pressure sensitive adhesives suitable for use in the present invention.

The following synthetic protocol was used for the synthesis of an AMMPAS pressure sensitive adhesive (the quantities of monomers used in the following are varied in various samples below, but the procedure is the same):

Using a mixture of monomers comprising 46.88% by weight iso-octyl acrylate (IOA), 37.5% butyl acrylate (BA), 3.13% MMA (methyl methacrylate), 5.31% acrylic acid (AA), 6.25% 2-acrylamido-2-methyl-1-propanesulfonic acid (AMMPAS), and 0.93% 2,2'-azobisisobutyronitrile (AIBN), an acrylic copolymer was prepared by solution polymerization in a mixture of ethyl acetate and ethanol (weight ratio 36/24), using 0.93% by weight (based on the weight of monomers) of AIBN as an initiator. Monomeric AMMPAS was mixed with ethanol (solution A), and the solution A was stirred to get a clear solution. Other monomers and the initiator were mixed with ethyl acetate (solution B). Solutions A and B are placed in a glass bottle reactor. The mixture in the reactor is purged with nitrogen for two minutes, followed by sealing the bottle reactor. The reactor is mounted in the oil bath, and heating and shaking the reactor is started. The reaction is carried out at 70° C. in the oil bath for 24 hours. Upon completion of the reaction, an AMMPAS emulsion acrylic pressure sensitive adhesive is formed, and may be used for further experiments.

Table 1 shows a series of exemplary emulsion acrylic pressure sensitive adhesives for use as polymer adhesive/coatings, made with AMMPAS, various monomers and AIBN as initiator:

TABLE 1

| | Reaction Mixture Composition, wt % | | | | | Total, |
|---|---|---|---|---|---|---|
| Run ID | AIBN | IOA | BA | MMA | AMMPAS | AA | wt % |
| 1 | 0.94 | 46.88 | 37.50 | 3.13 | 6.25 | 5.31 | 100 |
| 2 | 1.02 | 13.65 | 40.96 | 40.96 | 0.00 | 3.41 | 100 |
| 3 | 0.99 | 13.21 | 39.60 | 39.60 | 3.30 | 3.30 | 100 |
| 4 | 0.93 | 12.38 | 37.15 | 37.15 | 9.29 | 3.10 | 100 |
| 5 | 0.87 | 11.66 | 34.99 | 34.99 | 14.58 | 2.92 | 100 |
| 6 | 0.80 | 10.73 | 32.17 | 32.17 | 21.45 | 2.68 | 100 |
| 7 | 0.76 | 10.19 | 30.53 | 30.53 | 25.45 | 2.54 | 100 |
| 8 | 0.83 | 11.02 | 33.06 | 33.06 | 13.77 | 8.26 | 100 |
| 9 | 0.78 | 10.46 | 31.33 | 31.33 | 13.05 | 13.05 | 100 |
| 10 | 0.73 | 9.69 | 29.06 | 29.06 | 12.11 | 19.37 | 100 |

EXAMPLE A-2

A monomer mixture is made up by mixing 216.3 g. of 2-ethyl hexyl acrylate, 40.76 g of methyl acrylate, 0.32 g. of glycidyl methacrylate, 38.04 g of N-vinyl pyrrolidone and 22.05 g of acrylic acid. A portion of (79.37 g) of this mixture is introduced to a 2-liter reactor equipped with a pitched turbine agitator, a reflux condenser and a thermistor. Also, 34.4 g. of ethyl acetate and 39.4 g of hexane are added to the reactor. The contents of the reactor are heated to reflux and 0.12 g of Vazo 64, are manufactured and sold by DuPont in 5.0 g of ethyl acetate is added. After vigorous reflux started in a short time and the contents of the reactor are held for 5 minutes. At this time, the remaining monomers are mixed with 268.6 g. of ethyl acetate, 37.6 g. of hexane and 0.35 g. of Vazo 64 and are added as a single feed mixture over 3.5 hrs. All through the feed, temperature is maintained to keep reactor contents under reflux. One hour after end of feed, 0.17 g. Vazo 64 is added in 5 g. ethyl acetate and temperature is maintained for an additional hour. The percentage of solids content at the end of reaction is 47% and the viscosity is 8680 cps using #4@ 20 on a Brookfield viscometer.

EXAMPLE A-3

A pressure sensitive adhesive is prepared as described in Example A-2 except isooctyl acrylate is used in place of 2-ethylhexyl acrylate.

The following Table 2 contains further examples of adhesives. The following examples follow the same procedure of Example A-2. The amount of materials is parts by weight. In the table, NVP refers to N-vinyl pyrrolidone; MeA refers to methyl acrylate; GMA refers to glycidyl methacrylate; AA refers to acrylic acid; and 2-EHA refers to 2-ethylhexyl acrylate.

TABLE 2

| Example | NVP | MeA | GMA | AA | 2-EHA |
|---|---|---|---|---|---|
| A-3 | 30 | — | — | 3.0 | 67.0 |
| A-4 | 12 | 12.8 | 0.1 | 6.9 | 68.2 |
| A-5 | 12 | 12.9 | — | 6.9 | 68.2 |
| A-6 | 12 | — | 0.1 | 6.9 | 81 |
| A-7 | 12 | 12.6 | 0.3 | 6.9 | 68.2 |
| A-8 | 12 | — | 0.3 | 6.9 | 80.8 |
| A-9 | 12 | 4 | 0.3 | 6.9 | 76.8 |
| A-10 | 12 | 8 | 0.3 | 6.9 | 72.8 |
| A-11 | 12 | 12.8 | 0.3 | 3.6 | 71.3 |
| A-12 | 12 | 12.8 | 0.3 | 6.9 | 68 |
| A-13 | 10 | 13.6 | 0.3 | 7 | 69.1 |
| A-14 | 10 | 10 | 0.3 | 7 | 72.7 |
| A-15 | 10 | 12 | 0.3 | 7 | 70.7 |
| A-16 | 7.9 | 16.6 | 0.3 | 7 | 68.2 |
| A-17 | 7.9 | 16.6 | 0.3 | 6.9 | 68.3 |
| A-18 | 7.9 | 16.9 | 0.1 | 6.9 | 68.2 |
| A-19 | 7.9 | 12.8 | 0.3 | 7 | 72 |
| A-20 | 8 | 12.8 | 0.3 | 3.6 | 75.3 |

The pressure sensitive adhesives of the present invention exhibit good adhesion to low-energy surfaces. The pressure sensitive adhesive composition are also well suited for use with films like PVC that are known to often contain additives, such as plasticizers, which are capable of compromising adhesive performances.

The adhesive layer is applied to the label substrate using known techniques. These include roller coating, curtain coating, brushing, spraying, reverse roll coating, doctor knife, dipping, die coating, offset gravure techniques, etc. The coat weight is generally in the range of about 50 to about 70 grams per square meter (gsm), or from about 58 to about 64 gsm. The adhesive layer has a thickness of about 1.5 to about 3.5 mils (about 35 to about 90 microns), or from about 2 to about 3 mils (about 50 to about 75 microns).

In one embodiment, the pressure sensitive adhesives bond well to low energy surfaces. Low energy surfaces include such materials as polyethylene, polypropylene, polyurethane and other first pressure sensitive adhesives which are frequently used for packaging in the food industry.

In one embodiment, the pressure sensitive adhesive is an emulsion pressure sensitive adhesive. A useful emulsion pressure sensitive adhesive is prepared by polymerizing alkyl acrylates, vinyl esters, diesters of dicarboxylic acids and unsaturated acids. The alkyl acrylates typically contain from about 2 to about 12, or from about 4 to about 8 carbon atoms in the alkyl group. Examples of alkyl acrylates includes ethyl, n-butyl, hexyl, 2-ethylhexyl, and isooctyl acrylates, with 2-ethylhexyl acrylate particularly useful. As noted above, in one embodiment, the emulsion pressure sensitive adhesive is made from monomers including AMMPAS.

The vinyl esters typically have from about 2 to about 12, or from about 4 to about 8 carbon atoms in the alkyl group. Examples of vinyl esters include vinyl acetate, vinyl propionate, vinyl butyrate, vinyl versitate and the like, with vinyl acetate being useful.

The diesters of the dicarboxylic acids include alkyl esters of unsaturated diacids, such as maleic acid orlanhydride and fumaric acids. The alkyl group generally contains from about 2 to about 20, or from about 4 to about 16, or from about 6 to about 12 carbon atoms. Examples of diesters of diacids include butyl, octyl fumarate; hexyl, decyl maleate; di-2-ethylhexyl maleate; di-butyl fumarate; and di-2-ethylhexyl fumarate and mixtures thereof. The unsaturated acids generally contain from about 2 to about 12, or from about 2 to about 6 carbon atoms. Examples of the unsaturated acids include acrylic acid, methacrylic acid, itaconic acid, and the like.

In one embodiment, the alkyl acrylates are present in an amount of at least about 35%, or from about 35% to about 60% by weight. The vinyl esters are present in an amount from about 15% to about 35%, or from about 20% to about 25% by weight. The diesters of diacids are present in an amount from about 20% to about 35% by weight. The unsaturated acids are present in an amount up to 5%, or from about 1% to about 3% by weight. The pressure sensitive adhesives are described in U.S. Pat. Nos. 5,164,444; 5,183,459; and 5,264,532, all issued to Bernard, and U.S. Pat. No. 5,385,965, issued to Bernard et al. These patents are incorporated by reference for their disclosure of pressure sensitive adhesives, their components and methods of making the same.

In one embodiment, the label substrate is a polymeric facestock which contains migratory additives. The migratory additives improve the ability of the activator compound to migrate toward the pressure sensitive adhesive with the indicator compound. The additives include plasticizers and antioxidants. The plasticizer is a high-boiling solvent or softening agent, usually liquid. It is an ester made from an anhydride or acid and a suitable alcohol that usually has between 6 to 13 carbon atoms. The plasticizers may be adipate, phosphate, benzoate or phthalate esters, polyalkylene oxides, sulfonamides, etc. The plasticizers include but are not limited to DOA plasticizer (Dioctyl adipate), TEG-EH plasticizer (Triethylene glycol di-2-ethylhexanoate), TOTM plasticizer (Trioctyl trimellitate), triacetin plasticizer (Glyceryl triacetate), TXIB plasticizer (2,2,4,-trimethyl-1,3-pentanediol diisobutyrate), DEP plasticizer (Diethyl phthalate), DOTP plasticizer (Dioctyl terephthalate), DMP plasticizer (Dimethyl phthalate), DOP plasticizer (Dioctyl phthalate), DBP plasticizer (Dibutyl phthalate), polyethylene oxide, toluenesulfonamide, dipropylene glycol benzoate, and the like.

In another embodiment, the pressures sensitive adhesive contains a polyalkylene glycol. These additives are present in an amount from about 0.1% to about 20% or from about 0.5% to about 15% by weight. These additives help the migration of the activator compound. These additives may be in the polymeric material as well. The polyalkylene glycols include polyethylene glycols, polypropylene glycols, polybutyleneglycols, etc. Examples of polyethylene glycols PEG 400, PEG 600, etc. Commercially available polyethylene glycols include Carbowax 400 and Surfynol 104 or Surfynol 440 (available from AirProducts and Chemicals, Allentown, Pa. 1 8105), Carbowet 990 (available from Vantage), PEG 400 available from and Aerosol TO-75 (available from American Cyanamid, Wayne, N.J. 07470).

In one embodiment, the time indicating label has a label substrate, a first pressure sensitive adhesive containing an acid-base indicator and a polymeric material containing an activator. The polymeric material may include any suitable polymer in which the activator can be dissolved or dispersed. In one embodiment, the polymeric material is a pressure sensitive adhesive, such as one or more of those described above. In another embodiment, the polymeric material is any suitable polymer in which the activator can be dispersed or dissolved and from which the activator can migrate into the first pressure sensitive adhesive at a rate which is determined by the time and temperature to which the time-temperature indicating label is exposed after activation, and by the chemical content of the first pressure sensitive adhesive and the polymeric material.

Suitable polymeric materials include polyisobutylene rubber, acrylic rubber, styrene-butadiene rubbers, and polybutadiene-based rubbers. In another embodiment, the polymeric material may be a homopolymer or copolymer. In various embodiments, the polymeric material may comprise any of the polymers disclosed herein for use as the label substrate.

General classes of polymers suitable for use as the polymeric material include resins such as epoxy, phenol-formaldehyde, amino-formaldehyde, polyamides, vinyls, acrylics, polyurethanes, polyesters, water soluble resins, alkyds, elastomers, and rosins. Some of them are listed in the following references, "Resins for Surface Coatings", P. Oldring and G. Hayward, and "Resins and Varnishes for Ink and Paint", both published by McNair Publications, New York, N.Y.

In one embodiment, the polymeric material is a combination of a polyacrylate pressure sensitive adhesive and a hydrocarbon polymer such as a polyolefin. The hydrocarbon polymer is present in an amount to increase the compatibility of the activator in the pressure sensitive adhesive. The hydrocarbon resin is typically present in an amount from about 0.5% to about 40%, or from about 1% to about 30% by weight. In one embodiment, the hydrocarbon resin is a rubber. The rubber is generally any of those used as pressure sensitive adhesives. The hydrocarbon polymers are described herein. The polyacrylate pressure sensitive adhesive makes up the majority of the combination.

In another embodiment, the polymeric layer comprises from about 0.5% to about 40% or from about 1% to about 30% or from about 5% to about 25% by weight of the activator. The balance of the polymeric layer may be any non-sulfonic acid containing pressure sensitive adhesives such as acrylic pressure sensitive adhesives, or other suitable polymeric materials.

Acid-base Indicators

As described above the indicator compositions contain at least one of the above described carriers and at least one acid-base indicator. The acid-base indicator is generally present in an amount from about 0.01% to 10%, or from about 0.03% to about 7%, or from about 0.05% to about 5% by weight. Useful acid-base indicators are those which change color at a relatively low pH, upon exposure to an acid. The acid-base indicator should be one which produces a distinct color change, whether the color change is from one color to another or from colorless to colored, at the appropriate pH value.

In one embodiment, the acid-base indicator changes color at a pH less than about 4. In another embodiment, the acid-base indicator changes color at a pH less than about 3. In another embodiment, the acid-base indicator changes color at a pH less than about 2. In one embodiment, the acid-base indicator changes color at a pH of about 1.8 or less.

Suitable acid-base indicators are disclosed in CRC HANDBOOK OF CHEMISTRY AND PHYSICS, (74th Ed., CRC Press, Cleveland, Ohio, 1993). In one embodiment, the acid-base indicator is bromophenol blue (3', 3", 5', 5" tetrabromophenolsulfonephthalein). In another embodiment, the acid-base indicator is cresol red (o-cresolsulfonephthalein). In another embodiment, the acid-base indicator is metanil yellow (4'-aniline azobenzene—sulfonic acid, Na salt). Other useful acid-base indicators include Methyl Violet; Crystal Violet; Ethyl Violet; Malachite Green; Methyl Green; 2-(p-dimethylaminophenylazo)pyridine; Quinaldine Red; Paramethyl Red (p-(p-dimethylaminophenylazo)benzoic acid, Na salt); 4-phenylazodiphenylamine; Thymol Blue (thymolsulfonephthalein); Metacresol Purple (m-cresolsulfonephthalein); Orange IV (p-(p-anilinophenylazo(benzenesulfonic acid, Na salt); 4-o-tolylazo-o-toluidine; erythrosin, disodium salt; Benzopurpurine 48; N,N-dimethyl-p-(m-tolylazo)aniline; 4,4'-bis(2-amino-1-naphthylazo)2,2'-stilbene sulfonic acid; tetrabromophenolphthalein ethyl ester, K salt; p-dimethylaminoazobenzene; Methyl Orange (4'-dimethylaminoazobenzene-4-sulfonic acid, Na salt); and 2-(p-dimethylaminophenylazo)pyridine.

Activators

As used in the time indicating labels and methods, the activator composition comprises one or more of the above carriers and one or more activators. In one embodiment, the activator compound is an organic acid. Examples of organic acids include carboxylic acids, sulfonic acids, phosphoric acids, etc. The organic acids are those selected to migrate from the polymeric material into the indicator composition. The organic acids typically contain from 1 to about 40, or from about 4 to about 30, or from about 6 to about 24 carbon atoms. The acids cause the color change of the acid-base indicator. Specific organic acids which may be used include paratoluene sulphonic acid, naphthalene sulphonic acid and camphor sulphonic acid, oxalic acid, maleic acid, dichloroacetic acid, trichloroacetic acid, benzenesulfonic acid, chloroanilic acid, etc.

In one embodiment, the activator is an alkyl benzene sulfonic acid. In one embodiment, the alkyl group may be a straight-chain alkyl group or a branched-chain alkyl group. In one embodiment, the alkyl group may include from about 1 to about 30, or from about 3 to about 18, or from about 6 to about 12 carbon atoms. The alkyl group may be substituted or un-substituted. If substituted, it may be substituted with a group which does not change the substantially hydrocarbyl nature of the alkyl group. Such substituents include, for example, halogen atoms and aromatic moieties. Illustrative alkyl radicals include isopropyl, isobutyl, n-butyl, sec-butyl, the isomeric amyl radicals, the isomeric hexyl radicals, the isomeric heptyl radicals and the isomeric octyl radicals. Illustrative alkylphenyl radicals include butylphenyl, amylphenyl, diamylphenyl, octyl-phenyl, etc. Other substantially hydrocarbon radicals are useful such as tetradecyl, octadecyl, eicosyl, butylnaphthyl, hexylnaphthyl, octylnaphthyl, naphthenyl, etc. If substituted with halogen atoms, the alkyl group may be substituted with single or multiple halogen atoms. The halogen atoms include fluorine, chlorine, bromine and iodine.

The activator may be present in either a pressure sensitive adhesive or in an ink or varnish or other polymeric material layer, as these are described herein. The activator may be present at a suitable concentration, depending on the rate at which the activator diffuses, the strength of color change desired, and the nature of the activator itself. In one embodiment, the activator is present at a concentration in a range from about 1 wt % to about 10 wt %, in one embodiment from about 2 wt % to about 8 wt % and in one embodiment, at about 6 wt %.

Release Liners

In one embodiment, the time indicating label further includes a release liner attached to one or more of the adhesives. In one embodiment, the time-temperature indicating label, prior to activation, includes a release liner attached to the first pressure sensitive adhesive.

The release liner may comprise a backing liner and a layer of a cured release coating composition adhered to one side of the backing liner. The release coating is in contact with at least one adhesive layer when the release liner is adhered to the inventive time-temperature indicating label. The release coating composition can be any release coating composition known in the art. Silicone release coating compositions are preferred, and any of the silicone release coating compositions which are known in the art can be used. The major component of the silicone release coating is a polyorganosiloxane, and, more often, a polydimethylsiloxane. The silicone release coating composition may be room temperature cured, thermally cured, or radiation cured. Generally, the room temperature and thermally curable compositions comprise at least one polyorganosiloxane and at least one catalyst (or curing agent) for the polyorganosiloxane. These compositions may also contain at least one cure accelerator and/or adhesion promoter (sometimes referred to as an anchorage additive). As is known in the art, some materials have the capability of performing both functions, i.e., the capability of acting as a cure accelerator to increase the rate, reduce the curing temperature, etc., and also as an adhesion promoter to improve bonding of the silicone composition to the label substrate.

The release coating composition is applied to the backing liner and cured using known techniques. The application techniques include gravure, reverse gravure, offset gravure, roller coating, brushing, knife-over roll, metering rod, reverse roll coating, doctor knife, dipping, die coating, spraying, curtain coating, and the like. The coat weight is generally in the range of about 0.1 gsm to about 10 gsm or more, and in one embodiment about 0.3 gsm to about 2 gsm. In one embodiment, the thickness or caliper of the resulting release-coated liner may range from about 4 mils to about 10 mils (about 100 to about 250 microns), and in one embodiment from about 4 mils to about 6 mils (about 100 to about 150 microns).

The backing liner may comprise paper, polymer film, or a combination thereof. Any of the paper, polymer films, or combinations thereof, discussed above as being useful as the label substrate can be used as the backing liner. Paper liners are particularly useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the liner. Although paper of any weight can be employed as the liner material, paper having basis weights in the range of about 30 to about 120 lb/ream are useful, and papers having basis weights in the range of from about 60 to about 100 lb/ream are particularly useful.

Time Indicator

In a first embodiment, the present invention relates to a time indicating label comprising (a) a label substrate having a first and second surface, (b) an acid-base indicator composition, and (c) an activator composition, wherein one of (b) or (c) are on the first surface of the substrate and wherein (b) and (c) when brought in contact remain adhered. In another embodiment, the invention relates to time indicating label, including (a) a label substrate having first and second surfaces; (b) a first pressure sensitive adhesive, containing an acid-base indicator capable of changing color, on a first area of the first surface; and (c) a polymeric material, containing an activator compound, on a second area of the first surface.

In other embodiments, the time-temperature indicating label further includes a pressure sensitive adhesive on a second side of the label substrate. In other embodiments, the time-temperature indicating label further includes release liners on the pressure sensitive adhesives.

Referring to the drawings, FIG. 1 is a schematic cross-sectional view of a first embodiment of the time-temperature indicating label 100 in accordance with the present invention. FIG. 1 includes a label substrate 102, a first pressure sensitive adhesive 104 on a first area of one surface and a polymeric material 106 disposed on a second area of the same surface of the label substrate 102. The first pressure sensitive adhesive 104 contains an acid-base indicator capable of changing color. The polymeric material 106 contains an activator compound capable of causing a color change in the acid-base indicator.

Figure 2:
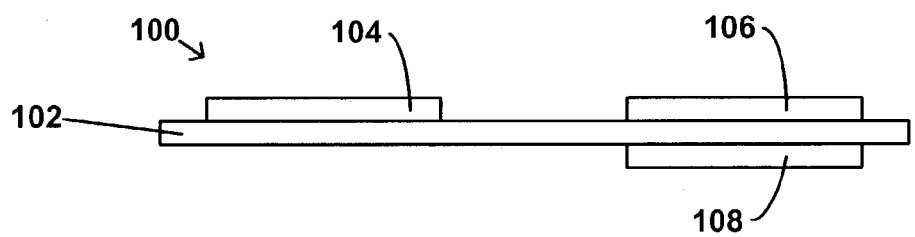
FIG. 2 is a schematic cross-sectional view of a second embodiment of the time-temperature indicating label, in accordance with the present invention.

FIG. 2 is a schematic cross-sectional view of a second embodiment of the time-temperature indicating label 100 in accordance with the present invention. The time-temperature indicating label 100 in FIG. 2 includes all the features of the embodiment shown in FIG. 1, and further includes a second adhesive 108. In one embodiment, the second adhesive 108 is a pressure sensitive adhesive, and is attachable to a low energy substrate, such as an LDPE container.

Figure 3:
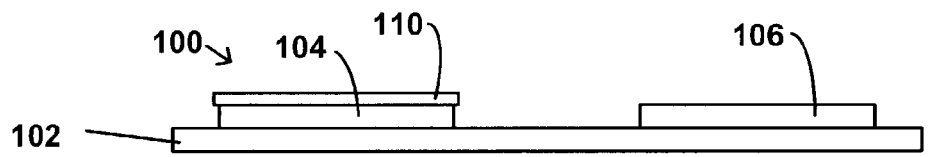
FIG. 3 is a schematic cross-sectional view of a third embodiment of the time-temperature indicating label, in accordance with the present invention.

FIG. 3 is a schematic cross-sectional view of a third embodiment of the time-temperature indicating label 100 in accordance with the present invention. The time-temperature indicating label 100 in FIG. 3 includes all the features of the embodiment shown in FIG. 1, and further includes a release liner 110 attached to the first pressure sensitive adhesive 104.

Figure 4A:
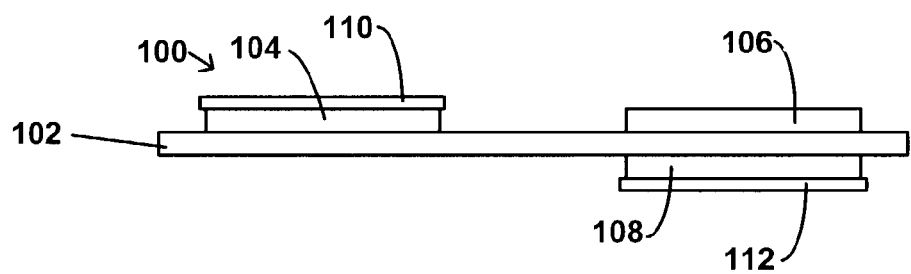
FIGS. 4A and 4B are schematic cross-sectional views of two alternate forms of a fourth embodiment of the time-temperature indicating label, in accordance with the present invention.
Figure 4B:
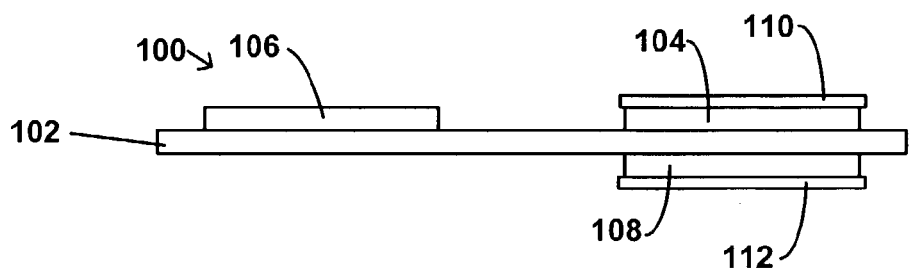

FIGS. 4A and 4B are schematic cross-sectional views of two alternate forms of a fourth embodiment of the time-temperature indicating label in accordance with the present invention. The time-temperature indicating label 100 in FIGS. 4A and 4B includes all the features of the embodiment shown in FIG. 2, and further includes a release liner 110 attached to the first pressure sensitive adhesive 104, and a second release liner 112 attached to the second adhesive 108. The first and second positions, at which the first pressure sensitive adhesive 104 and the polymeric material 106 are located on the label substrate 102, are switched between FIGS. 4A and 4B.

Figure 5A:
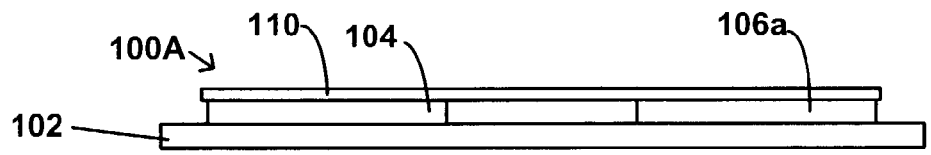
FIGS. 5A and 5B are schematic cross-sectional views of two alternate forms of a fifth embodiment of a time-temperature indicating label, in accordance with the present invention.
Figure 5B:
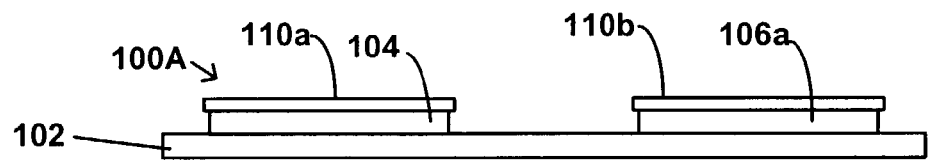

FIGS. 5A and 5B are schematic cross-sectional views of two alternate forms of a fifth embodiment of a time-temperature indicating label 100A, in which the polymeric material in which the activator is included is a third pressure sensitive adhesive 106a. In FIG. 5A, a single release liner 110 is used for both the first pressure sensitive adhesive 104 and the third pressure sensitive adhesive 106a. In FIG. 5B, the release liner 110 is provided in two parts, 110a and 110b, on the first pressure sensitive adhesive 104 and the third pressure sensitive adhesive 106a, respectively, in accordance with another embodiment of the present invention.

Figure 6:
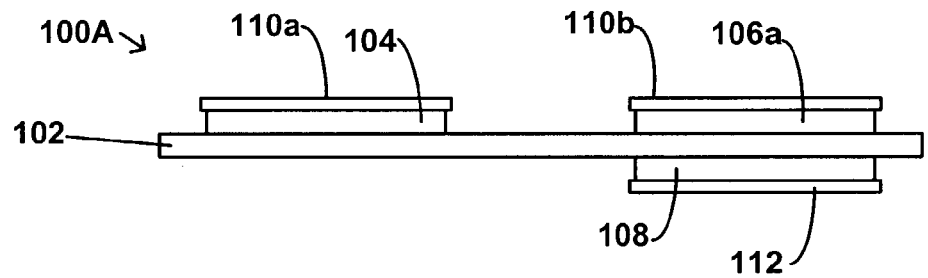
FIG. 6 is a schematic cross-sectional view of an alternate embodiment of the time-temperature indicating label shown in FIG. 5B, in accordance with the present invention.

FIG. 6 is a schematic cross-sectional view of an alternate embodiment of the time-temperature indicating label 100A shown in FIG. 5B, in which the release liner 110 is provided in two parts, 110a and 110b, on the first pressure sensitive adhesive 104 and the third pressure sensitive adhesive 206, respectively, and including the release liner 112 on the second adhesive 108, in accordance with another embodiment of the present invention. In an alternative embodiment, (not shown) the time-temperature indicating label 100 shown in FIG. 6 may include a single release liner 110, such as that shown in FIG. 5A.

Figure 7:
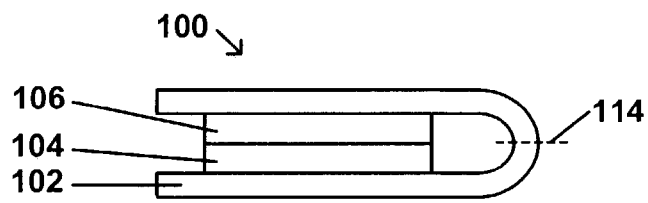
FIG. 7 is a schematic cross-sectional view of the first embodiment of the time-temperature indicating label, shown in FIG. 1, in which the label substrate has been folded over to bring the acid-base indicator in the first pressure sensitive adhesive into activating contact with the activator in the polymeric material, in accordance with the present invention.

FIG. 7 is a schematic cross-sectional view of the first embodiment of the time-temperature indicating label 100, shown in FIG. 1, in which the label substrate has been folded over to bring the acid-base indicator in the first pressure sensitive adhesive 104 into activating contact with the activator in the polymeric material 106, in accordance with the present invention. The embodiment shown in FIG. 7 further includes a folding axis 114. When the label substrate 102 is folded at the folding axis 114, the first pressure sensitive adhesive 104 can be brought into contact with the polymeric material 106, such that the time-temperature indicating label is activated. In an alternative embodiment, not shown, the time-temperature indicating label 100 shown in FIG. 7 may include the third pressure sensitive adhesive 106a, such as that shown in FIGS. 5A and 5B.

Figure 8:
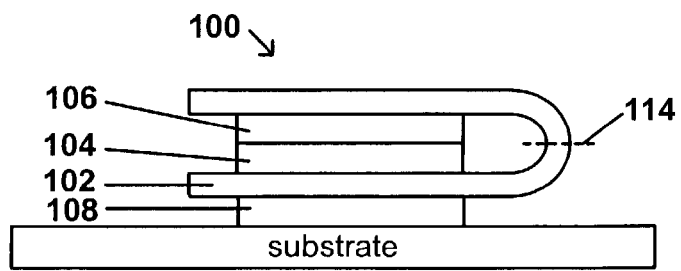
FIG. 8 is a schematic cross-sectional view of the second embodiment of the time-temperature indicating label, which has been activated as in FIG. 7, and which has been attached to a substrate by means of a second adhesive, in accordance with the present invention.

FIG. 8 is a schematic cross-sectional view of the second embodiment of the time-temperature indicating label 100, which has been activated as in FIG. 7, and which has been attached to a substrate by means of the second adhesive 108, in accordance with the present invention. The embodiment shown in FIG. 8 further includes a folding axis 114, as described above with respect to FIG. 7. In an alternative embodiment (not shown), the time-temperature indicating label 100 shown in FIG. 8 may include the polymeric material in the form of a third pressure sensitive adhesive 106a, such as that shown in FIGS. 5A and 5B.

Figure 9:
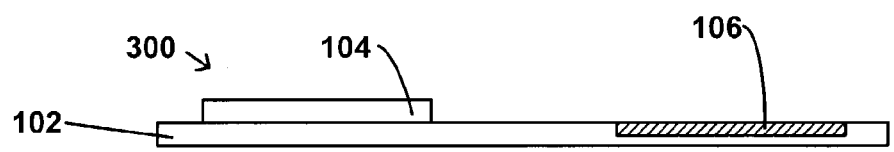
FIG. 9 is a schematic cross-sectional view of an alternative form of the first embodiment of the time-temperature indicating label, in which the polymeric material containing the activator has been embedded in the label substrate, in accordance with the present invention.

FIG. 9 is a schematic cross-sectional view of a third embodiment of a time-temperature indicating label 300, in which the polymeric material 106 containing the activator has been embedded in the label substrate 102. The time-temperature indicating label 300 in FIG. 9 includes all the features of the embodiment shown in FIG. 1, except as noted above. The polymeric material 106 may be embedded in the label substrate 102 by a suitable process, such as co-extrusion, or applying a thin layer of the polymeric material 102 followed by a calendering step in which the polymeric material 102 including the activator is pressed into the label substrate 102.

As a further alternative of the third embodiment, the polymeric material 106 may be the label substrate 102, and the activator compound may be embedded or implanted into the label substrate 102 in the area 106 by a suitable process. Such implantation may be by ion or molecular implantation or other suitable processes. For example, laser implantation may be used, as suggested in Zhigilei, et al, "The role of inertial and spatial confinement in laser interaction with organic materials", presented at World Muticonference On Systemics, Cybernetics and Informatics, Jul. 22-25, 2001, Orlando, Fla. Therein, the authors propose the controlled deposition of functional organic molecules into a designated region of a polymer substrate by laser irradiation of a microscopic amount of molecular substance spatially confined in the tip of a micropipette.

Although not shown, the embodiment of FIG. 9 may further include a release liner on the first pressure sensitive adhesive, may further include a second pressure sensitive adhesive, and the second pressure sensitive adhesive may further include a release liner thereon, for example such as those shown in FIGS. 2, 3 and 4.

Figure 10:
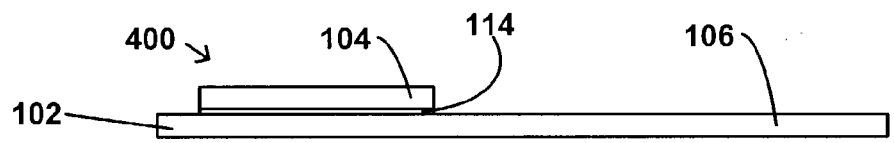
FIG. 10 is a schematic cross-sectional view of another alternative form of the first embodiment of the time-temperature indicating label, in which the label substrate contains the activator as an integral component, in accordance with the present invention.

FIG. 10 is a schematic cross-sectional view of a fourth embodiment of a time-temperature indicating label 400, in which the label substrate 102 contains the activator as an integral component. In this embodiment, in essence the polymeric material 106 is the label substrate 102, and the label substrate 102 contains the activator compound. The activator compound may be evenly and uniformly distributed throughout the label substrate 102. The time-temperature indicating label 400 in FIG. 10 includes all the features of the embodiment shown in FIG. 1, except as noted above, and except that it further includes a barrier layer 114 between the first pressure sensitive adhesive 104, which contains the acid-base indicator, and the label substrate 102, which contains the activator. The barrier layer 114 is needed to avoid premature activation of the time-temperature indicator through the backside of the first pressure sensitive adhesive layer 104.

The barrier material may be any material that is capable of inhibiting the migration of the activator compound. Barrier layer materials include glassy polymers, semi-crystalline polymers, physically and chemically crosslinked elastomers, segmented polyesters, radiation crosslinked polybutadiene, and pressure sensitive adhesives. Examples of suitable glassy polymers include polystyrene and polymethyl methacrylate. Examples of suitable semi-crystalline polymers include polyethylene, polypropylene and polyesters. Examples of suitable physically crosslinked elastomers include triblock copolymers, such as styrene-isoprene-styrene block copolymers, and segmented polyurethane elastomers. An example of a suitable chemically cross-linked elastomer is sulfur crosslinked natural rubber. In the one embodiment, the barrier material is a pressure sensitive adhesive include acrylic pressure sensitive adhesives, silicone pressure sensitive adhesives, rubber resin blend pressure sensitive adhesives, triblock copolymer pressure sensitive adhesives, and vinyl ether polymer pressure sensitive adhesives. Rubber resin blend pressure sensitive adhesives include natural rubber, polybutadiene, polyisobutalene, styrene butadiene random copolymers, synthetic polyisoprene, and butyl rubber. Useful triblock copolymer pressure sensitive adhesives include styrene-isoprene-styrene copolymers, styrene-butadiene-styrene copolymers, styrene-ethylene butylene-styrene copolymers, and styrene-ethylene propylene-styrene copolymers.

An important advantage of the fourth embodiment of the time-temperature indicator shown in FIG. 10 is that it is much easier to align the first pressure sensitive adhesive 104 containing the acid-base indicator with the activator-containing label substrate 102.

Although not shown, the embodiment of FIG. 10 may further include a release liner on the first pressure sensitive adhesive, may further include a second pressure sensitive adhesive, and the second pressure sensitive adhesive may further include a release liner thereon, for example such as those shown in FIGS. 2, 3 and 4.

Figure 11:
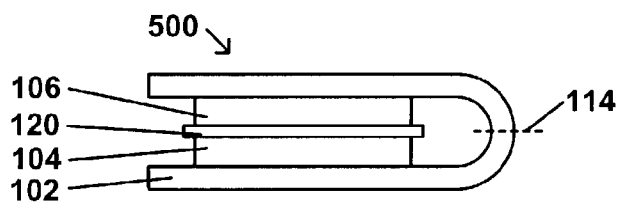
FIG. 11. is a schematic cross-sectional view of a fifth embodiment of the time-temperature indicating label, in which the label substrate is folded prior to use, with a release liner between the first pressure sensitive adhesive and the polymeric material, in accordance with the present invention.

FIG. 11 is a schematic cross-sectional view of a fifth embodiment of the time-temperature indicating label 500 of the present invention. In this embodiment, the label substrate 102 is folded during manufacture, and a release liner 120 is inserted between the first pressure sensitive adhesive 104 and the polymeric material 106. In the fifth embodiment, the polymeric material is an adhesive, or is otherwise attached to the release liner 120. In this embodiment, the time-temperature indicating label 500 may be conveniently folded prior to use. When the label 500 is ready for use, it can be unfolded or opened, the release liner 120 removed, and then the label 500 is refolded or closed, to bring the polymeric material 106 into activating contact with the first pressure sensitive adhesive 104, at which time the activator may begin its time- and temperature-dependent migration into the indicator-containing first pressure sensitive adhesive 104.

Figure 12:
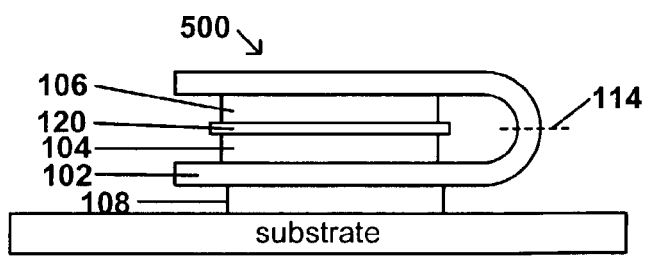
FIG. 12 is a schematic cross-sectional view of an alternative form of the fifth embodiment of the time-temperature indicating label similar to that of FIG. 11, which has been attached to a substrate by means of a second adhesive, in accordance with the present invention.

FIG. 12 is a schematic cross-sectional view of a fifth embodiment of the time-temperature indicating label 500 of the present invention, similar to that of FIG. 11, in which the label 500 has been attached to a substrate by means of a second adhesive 108. The embodiment of the time-temperature indicator 500 shown in FIG. 12 may be conveniently attached to a substrate at any point during the manufacture of the substrate, and may be activated at any appropriate later time.

An important advantage of the embodiment of the time-temperature indicating label 500 shown in FIGS. 11 and 12 is its ease of use in activation and alignment of the layers. In addition, the label substrate 102 provides additional protection for the release liner, helping to prevent premature removal. Since the label substrate 102 is folded during manufacture, the folding axis can be precisely located, and the "memory" of the folding axis in the label substrate assists in alignment. Thus, when the label 500 is to be activated, the fist pressure sensitive adhesive 104 and the polymeric material 106 may be easily brought into proper alignment.

In one embodiment, the layer 120 may be a time-delay or diffusion-delay layer 120. A time-delay or diffusion-delay layer acts to provide a longer diffusion path between the acid-base indicator layer and the activator layer. The time-delay or diffusion-delay layer may be present as a separate layer or as a layer on the indicator composition or activator composition. Thus, for example, use of such a layer provides a delay in the onset of diffusion of the activator into the indicator layer, thus delaying the onset of any color change for a selected period of time after activation of the time-temperature indicating label 500. The time may be selected based on the identity and/or the thickness of the layer 120. In one embodiment, the time-delay layer 120 may comprise a pressure sensitive adhesive, and in one embodiment, the time-delay layer 120 may comprise a varnish, such as any of the varnishes disclosed herein or known in the art. In an embodiment including a varnish as the time-delay layer 120, a coat weight may be suitable selected based on, e.g., the time delay desired, and may be, for example, from about 0.2 gsm to about 10 gsm, in one embodiment from about 0.5 gsm to about 6 gsm, and in one embodiment from about 1 gsm to about 3 gsm.

The time-delay or diffusion-delay layer 120 may comprise any suitable pressure sensitive material described herein, or any varnish or other coating described herein. Exemplary suitable materials may include, for example, a printable indicator barrier, such as: Aqua Gloss Film OPV from Environmental Inks & Coatings (Water-based), Dow ink, 601 Avery Scuff OPV MOD 2 (UV cured varnish), or Sun Chemical, Flexotuf Extending Varnish, F75665 (Solvent-based), or as a pressure sensitive adhesive indicator barrier, a material such as S-2001 (clear permanent PSA).

In one embodiment, the time temperature indicator is prepared by using double sided tapes made of the first pressure sensitive adhesive and the polymeric material. The double sided tapes are prepared as is known to those in the art. The double sided tapes have adhesive on the lower side for attaching the tapes to the label substrate. The adhesives may be any of those described herein and known to those in the art. The first pressure sensitive adhesive and the polymeric material, when a pressure sensitive adhesive will typically have release liners over them.

Attachment of the Time-temperature Indicating Label to a Substrate

In one embodiment, the label substrate further comprises a pressure sensitive adhesive on the second surface. Any pressure sensitive adhesive may be used, for example, to attach the time-temperature indicating label to a suitable substrate, such as a food package. Freezer grade adhesives like AT20A, Q075 and S2001 are useful for cold temperature applications. Suitable pressure sensitive adhesives are described herein. In one embodiment, the pressure sensitive adhesive is attachable to a low energy surface. It is more important for the pressure sensitive adhesive to be attachable and to remain attached to a low energy surface, since this adhesive is used to attach the time-temperature indicating label to the substrate.

Activation of the Time-temperature Indicating Label

As described above, the label substrate may be manipulated, such as by folding or bending the label, to bring at least a portion of the first pressure sensitive adhesive into activating contact with at least a portion of the first pressure sensitive adhesive. Activating contact may be direct contact or contact through one or more additional layers, such as the barrier layer or a time delay or diffusion-delay layer.

In another embodiment, such as that shown in FIGS. 11 and 12, the label substrate may be folded during its manufacture, with a release liner placed between the first adhesive and the polymeric material, in an embodiment in which the polymeric material is a pressure sensitive adhesive. This embodiment may be activated by separating the release liner from the first pressure sensitive adhesive and from the polymeric material, and re-folding the label substrate, to bring the first pressure sensitive adhesive into activating contact with the polymeric material.

Method of Determining the Time-temperature History

In one embodiment, the present invention relates to a method of determining the time-temperature history of an article, including (a) providing a time-temperature indicating label, including a label substrate having first and second surfaces; an indicator layer containing an acid-base indicator capable of changing color on a first area of the first surface; and an activator composition containing an activator compound capable of causing a color change in the acid-base indicator, the polymeric material on a second area of the first surface; (b) activating the time-temperature indicating label by bringing at least a portion of the indicator composition into contact with at least a portion of the activator composition; and (c) attaching the time-temperature indicating label to a substrate.

In one embodiment, the label substrate further includes a second pressure sensitive adhesive on the second major face for attaching the time-temperature indicating label to a substrate, and the step of attaching comprises applying the second pressure sensitive adhesive to the substrate. In one embodiment, the step of activating the label includes folding the label substrate.

In one embodiment, the step of attaching the time-temperature indicating label to a substrate may include removing at least one release liner from at least one adhesive. In one embodiment, the first pressure sensitive adhesive is covered by a release liner. The release liner covering the pressure sensitive adhesive, when present, is removed when the device is activated.

In one embodiment, the second pressure sensitive adhesive is covered by a release liner. The release liner covering the second pressure sensitive adhesive, when present, is removed when the device is activated.

In one embodiment, the second pressure sensitive adhesive is not covered by a separate release liner, but the label substrate is provided in a rolled form or stacked form, so that the second pressure sensitive adhesive is disposed against the release liner attached to the polymeric material. Thus, as the label substrate is unrolled from a large roll to dispense individual time-temperature indicating labels, the second pressure sensitive adhesive is detached from its attachment to the release liner covering the polymeric material, and the label is then attached to a substrate. In this embodiment, the time-temperature indicating label will be attached to the substrate before the time-temperature indicating label is activated.

In one embodiment, both of the first and the second pressure sensitive adhesives are covered by release liners. In an embodiment in which both the first and second pressure sensitive adhesives are covered by release liners, the time-temperature indicating label may be activated prior to its attachment to a substrate.

In an embodiment in which the polymeric material is a third pressure sensitive adhesive, the third pressure sensitive adhesive may have a release liner attached thereto. In an embodiment in which the third pressure sensitive adhesive is present and is covered by a release liner, the step of activating would include removing the release liner from the third pressure sensitive adhesive.

After the time-temperature indicating label has been activated and attached to a suitable substrate, the label may be monitored as needed. Since the color change is visible through the label substrate, the label may be monitored simply by observing the label during routine handling of the packaging to which the label is attached.

As has been described above, in the present invention, the activator migrates from the activator composition into the indicator composition. As a result of the activator coming into contact with the acid-base indicator, the acid-base indicator changes color. The color change may be from colorless to colored, or may be from a first color to a second color. In either case, the color which is newly formed should be strong enough to be easily observable through the label substrate. Of course, the label substrate should be sufficiently transparent that the color can be observed through the label substrate, i.e., substantially transparent as defined above.

Thus, in one embodiment, the activator compound is capable of migrating at a rate which is temperature-dependent from the polymeric material into the first pressure sensitive adhesive. In one embodiment, at a given temperature, the rate of migration is determined by the components of at least one of the first pressure sensitive adhesive and the polymeric material.

In one embodiment, the rate of migration of the activator compound depends on the nature of the polymer in the first pressure sensitive adhesive, i.e., the specific combination of monomers used to form the polymeric pressure sensitive adhesive. In another embodiment, the rate of migration depends also on the nature of the adhesive in the polymeric material when the polymeric material is a third pressure sensitive adhesive. Thus, by judicious selection of the monomers used in forming the first pressure sensitive adhesive and/or the polymeric material, the rate of migration can be controlled and adjusted.

In another embodiment, the rate of migration of the activator compound depends on the nature of additives which are included in the first pressure sensitive adhesive and/or the polymeric material. Such additives may include, for example, plasticizers, stabilizers, tackifiers, and other known additives for polymers and adhesives. The amount of any of these additives may affect the rate of migration. The amount of these additives may be adjusted to as to control the rate of migration to correspond at least approximately to the rate of degradation of the foodstuff or other material to be monitored at a given temperature.

In another embodiment, the rate of color change at a given temperature is a function of the concentration of the acid-base indicator in the first pressure sensitive adhesive. Thus, by increasing the concentration of the acid-base indicator, the time for color development can be extended. This effect is demonstrated in the following Examples.

In another embodiment, the rate of color change at a given temperature is a function of the coating weight of the first pressure sensitive adhesive. Thus, by increasing the quantity of the acid-base indicator by increasing the coating weight of the first pressure sensitive adhesive, the time for color development can be extended. This effect is demonstrated in the following Examples.

Figure 13:
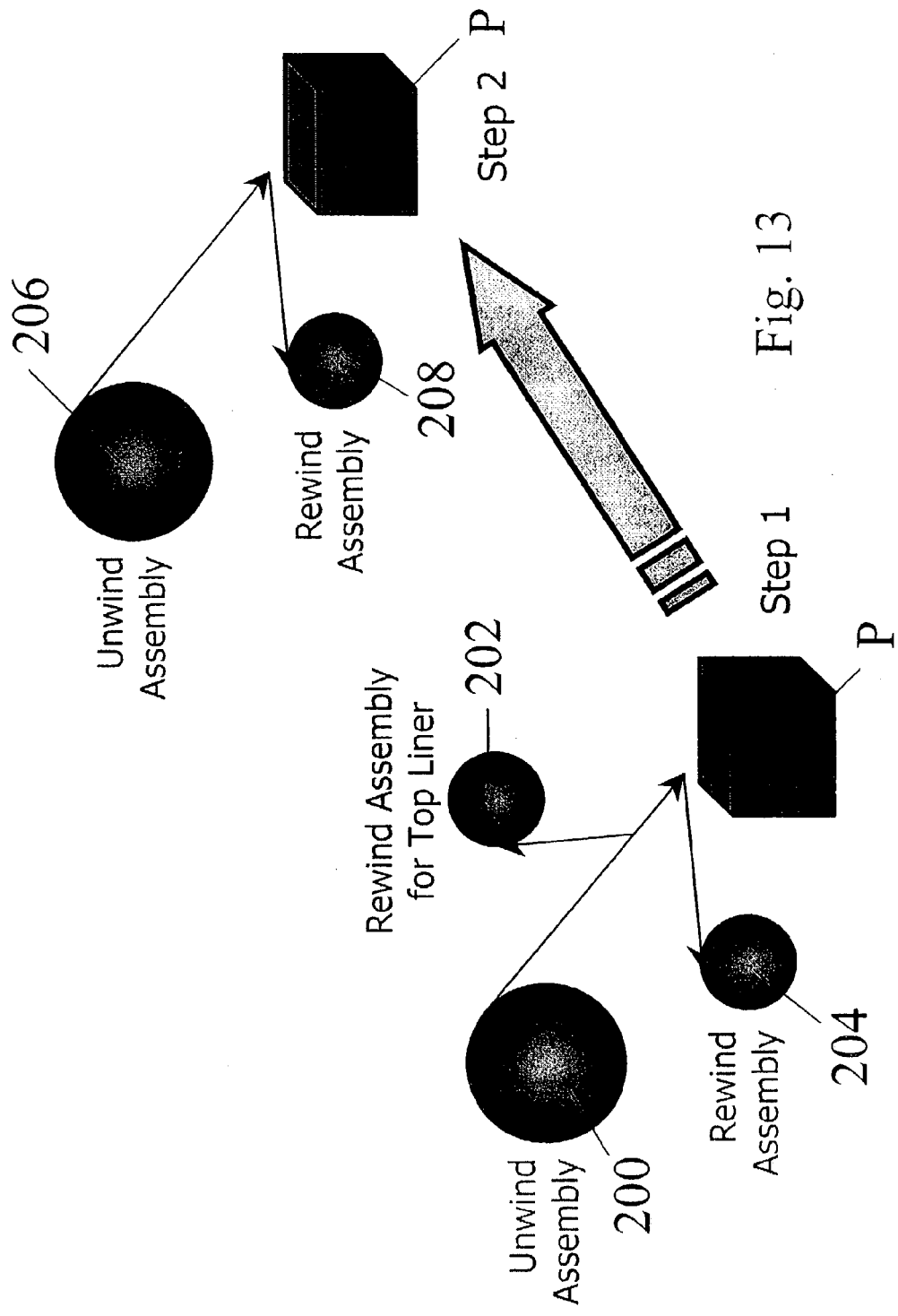
FIG. 13 is a schematic process flow diagram of a first embodiment of dispensing the time-temperature indicator in accordance with the present invention.

FIG. 13 is a schematic process flow diagram of a first embodiment of dispensing the time-temperature indicator in accordance with the present invention. FIG. 13 depicts a two step process included in dispensing a two-part time-temperature indicator. Included in FIG. 13, associated with Step 1, are an unwind assembly 200, a rewind assembly for top liner 202, a second rewind assembly for bottom liner 204, and a product package P to which the time-temperature indicator will be attached. FIG. 13 includes, associated with Step 2, a second unwind assembly 206, a rewind assembly 208 and the product package P.

In the process shown in FIG. 13, in Step 1, the unwind assembly 200 contains a web including the time-temperature indicator label substrate. The label substrate has first and second surfaces, and an indicator composition, containing an acid-base indicator capable of changing color, is located on the first surface. The indicator composition is covered by a top release liner. The label substrate further includes a second pressure sensitive adhesive on the second surface. The second pressure sensitive adhesive may be used, for example, for attaching the time-temperature indicator to a product substrate. The second pressure sensitive adhesive is covered by a bottom release liner.

As shown in FIG. 13, in Step 1, the label substrate is unwound from the unwind assembly 200, and the top release liner is removed by the rewind assembly 202, and the bottom release liner is removed by the second rewind assembly 204, as the second pressure sensitive adhesive comes into contact with the product package P with which it will be used.

As shown in FIG. 13, in the product package P is then transferred to Step 2, at which time the activator will be applied, and the time-temperature indicator activated.

As shown in FIG. 13, in Step 2, the second unwind assembly 206 contains a web including the polymeric material, which contains an activator compound capable of causing a color change in the acid-base indicator. In the embodiment shown in FIG. 13, the polymeric material is a third pressure sensitive adhesive. The third pressure sensitive adhesive is covered by an activator release liner.

As shown in FIG. 13, the polymeric material is unwound from the second unwind assembly 206, and the activator release liner is removed by the rewind assembly 208 as the polymeric material is applied to the first pressure sensitive adhesive on the time-temperature label substrate which has already been applied to the product package P. The product package P now contains an activated time-temperature label.

As noted in FIG. 13, it is important that the polymeric material be applied in registration with the first pressure sensitive adhesive.

The steps of the embodiment shown in FIG. 13 may be carried out, for example, in the product packaging line of the manufacturer of the product at the time the product is dispensed into the product package.

Figure 14:
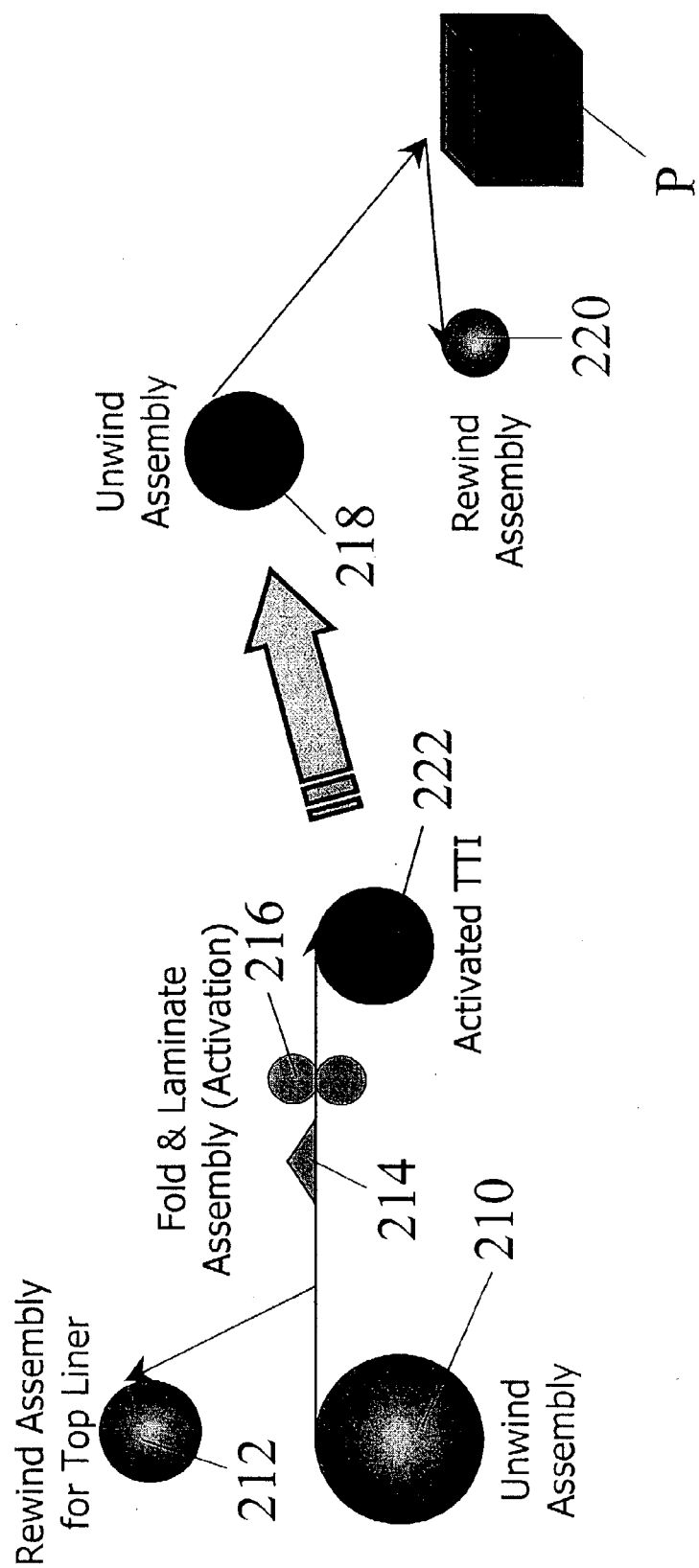
FIG. 14 is a schematic process flow diagram of a second embodiment of dispensing the time-temperature indicator in accordance with the present invention.

FIG. 14 is a schematic process flow diagram of a second embodiment of dispensing the time-temperature indicator in accordance with the present invention. FIG. 14 depicts a two step process included in dispensing a one-part time-temperature indicator. Included in FIG. 14, associated with a first step, are an unwind assembly 210, a rewind assembly for top liner 212 and a fold & laminate assembly 214, including a nip roller 216. Associated with a second step is a second unwind assembly 218, a rewind assembly 220 and the product package P to which the time-temperature indicator will be attached.

In the process shown in FIG. 14, in the first step, the unwind assembly 210 contains a web including the time-temperature indicator label substrate. The label substrate has first and second surfaces, a first pressure sensitive adhesive containing an acid-base indicator capable of changing color. The first pressure sensitive adhesive is located on a first area of the first surface. The label substrate further includes a polymeric material containing an activator compound capable of causing a color change in the acid-base indicator. The polymeric material is located on a second area of the first surface, near the first area. The polymeric material may be a pressure sensitive adhesive, or may not be an adhesive. A release liner covers the first pressure sensitive adhesive and, in an embodiment in which the polymeric material is a pressure sensitive adhesive, the release liner also covers the second pressure sensitive adhesive.

The label substrate further includes a second pressure sensitive adhesive, on the second surface of the label substrate. The second pressure sensitive adhesive is covered by a release liner.

As shown in FIG. 14, in the first step, the label substrate is unwound from the unwind assembly 210, and the release liner is removed by the rewind assembly 212. The label substrate then proceeds into the fold & laminate assembly 214. In the fold & laminate assembly 214, the label substrate is folded over, to bring the first pressure sensitive adhesive into contact with the polymeric material. As a result of this contact, the time-temperature indicator is activated. The label substrate proceeds through the nip roller 216 to assure full contact and activation of the time-temperature indicator. The activated time-temperature indicator is rewound onto a rewind assembly 222.

The activated time-temperature indicator on the rewind assembly 222 is then transferred to the unwind assembly 218 in a second step. The activated time-temperature indicator is unwound from the unwind assembly 218, the release liner over the second pressure sensitive adhesive is removed and taken up by the rewind assembly 220, and the activated time-temperature indicator is applied to the product package P.

The steps of the embodiment shown in FIG. 14 may be carried out, for example, in the product packaging line of the manufacturer of the product at the time the product is dispensed into the product package P. If the activated time-temperature indicator is protected from heat, the first step could be carried out by a manufacturer of the indicator, and the second step carried out by the manufacturer of the product at the time the product is dispensed into the product package P.

Figure 15:
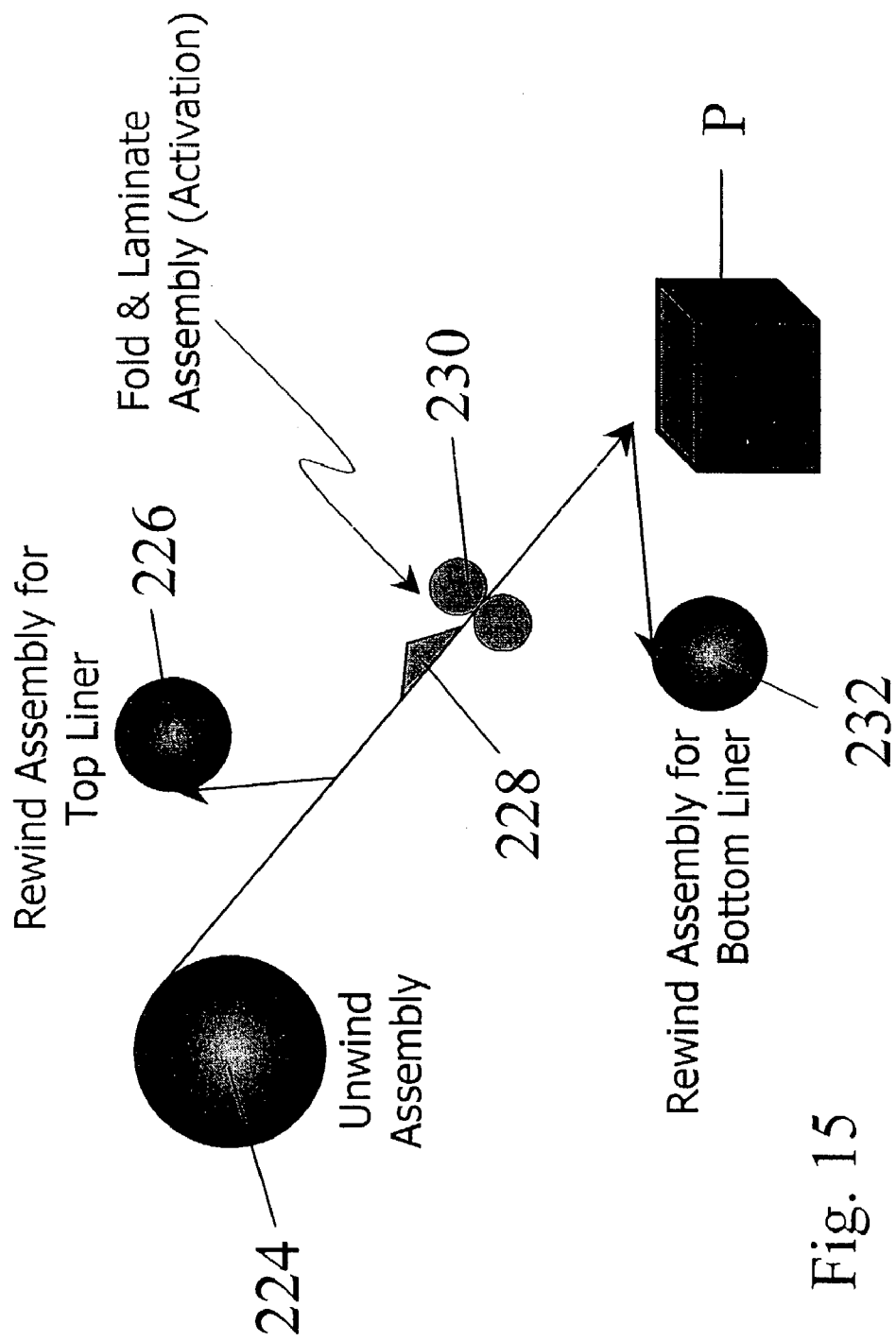
FIG. 15 is a schematic process flow diagram of a third embodiment of dispensing the time-temperature indicator in accordance with the present invention.

FIG. 15 is a schematic process flow diagram of a third embodiment of dispensing the time-temperature indicator in accordance with the present invention. FIG. 15 depicts a single step process included in dispensing a one-part time-temperature indicator. Included in FIG. 15, are an unwind assembly 224, a rewind assembly for top liner 226, a fold & laminate assembly 228 including a nip roller 230, a rewind assembly for bottom liner 232 and a product package P to which the time-temperature indicator will be attached.

In the process shown in FIG. 15, the unwind assembly 224 contains a web including the time-temperature indicator label substrate. The label substrate has first and second surfaces, a first pressure sensitive adhesive containing an acid-base indicator capable of changing color. The first pressure sensitive adhesive is located on a first area of the first surface. The label substrate further includes a polymeric material containing an activator compound capable of causing a color change in the acid-base indicator. The polymeric material is located on a second area of the first surface, near the first area. The polymeric material may be a pressure sensitive adhesive, or may not be an adhesive. A release liner covers the first pressure sensitive adhesive and, in an embodiment in which the polymeric material is a pressure sensitive adhesive, the release liner also covers the second pressure sensitive adhesive.

The label substrate further includes a second pressure sensitive adhesive, on the second surface of the label substrate. The second pressure sensitive adhesive is covered by a release liner.

As shown in FIG. 15, the label substrate is unwound from the unwind assembly 224, and the release liner is removed by the rewind assembly 226. The label substrate then proceeds into the fold & laminate assembly 228. In the fold & laminate assembly 228, the label substrate is folded over, to bring the first pressure sensitive adhesive into contact with the polymeric material. As a result of this contact, the time-temperature indicator is activated. The label substrate proceeds through a nip roller 230 to assure full contact and activation of the time-temperature indicator. The activated time-temperature indicator then proceeds to the product package P, where the release liner over the second pressure sensitive adhesive is removed by the rewind assembly 232, and the activated time-temperature indicator is applied to the product package P.

The steps of the embodiment shown in FIG. 15 may be carried out, for example, in the product packaging line of the manufacturer of the product at the time the product is dispensed into the product package P.

In the embodiments shown in FIGS. 14 and 15, if it is desired to make the time-temperature indicating label 500 such as shown in FIGS. 11 and 12, a release liner 120 may be inserted between the pressure sensitive adhesive and the polymeric material at an appropriate point prior to the fold and laminate assembly 214 or 228. Alternatively, to make the label 500, one of the release liners, or a portion thereof, may be left in place and not removed prior to the fold and laminate assembly 214 or 228.

Figure 16:
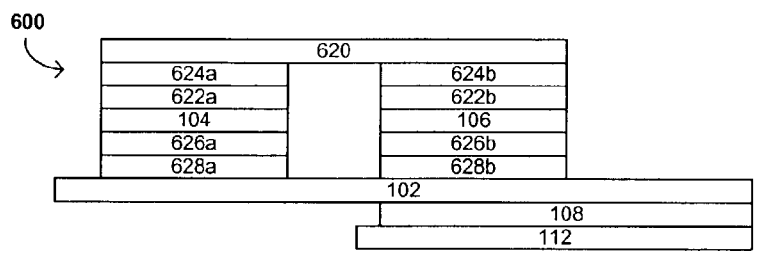
FIG. 16 is a schematic cross-sectional view of a sixth embodiment of the time-temperature indicating label, in accordance with the present invention.

Referring now to FIGS. 16-19, there is shown schematic cross-sectional views of a sixth embodiment of the time-temperature indicating label 600 of the present invention. As noted above, in the following, like reference numerals are applied to like elements, and the specific description will be omitted, since such elements may be substantially the same as those disclosed and described above. FIG. 16 is a schematic cross-sectional view the time-temperature indicating label 600, following assembly of the label 600, but prior to its activation. As shown in FIG. 16, the label 600 includes a label substrate 102, a first pressure sensitive adhesive 104 on a first area of one surface and a polymeric material 106 disposed on a second area of the same surface of the label substrate 102. The first pressure sensitive adhesive 104 contains an acid-base indicator capable of changing color. The polymeric material 106 contains an activator compound capable of causing a color change in the acid-base indicator. As shown in FIG. 16, the label substrate 102 has a bottom surface to which is attached an adhesive 108 and a release liner 112. The adhesive 108 and the release liner 112 in this embodiment may comprise any of the materials described above with respect to the first embodiment of the present invention. In one embodiment, the adhesive 108 is an all-temperature pressure-sensitive adhesive, such as AT-20 or AT-1, available from Avery Dennison Corporation. In one embodiment, the substrate 102 is a suitable polymeric material such as polyethylene terephthalate (PET) or biaxially oriented polypropylene (BOPP), having a suitable thickness, for example, of about 2 mils, in one embodiment about 2.6 mils, and in another embodiment from about 1 mil to about 10 mils. The release liner 112 may be any suitable material, such as PET or BOPP, and having a thickness, for example, of about 1.5 mils, or from 1 mil to about 10 mils. The activator-containing polymeric material layer 106 may have a similar thickness, and in one embodiment may be about 1.5 mils. similarly, the indicator-containing layer 104 may have a similar thickness, and in one embodiment is applied at a coat weight from about 2 to about 20 gsm.

As shown in FIG. 16, the label 600 further includes an outer face layer 620, to which is attached a pair of protective release layers 622a and 622b, by adhesive layers 624a and 624b, respectively. The protective release layer 622a is attached to the first pressure sensitive adhesive 104, and the protective release layer 622b is attached to the polymeric material 106. As shown in FIG. 16, the label 600 further includes transfer carriers 626a and 626b which are attached to the label substrate 102 by transfer adhesive layers 628a and 628b, respectively.

In one embodiment, the adhesive layers 624a, 624b, and the transfer adhesive layers 628a, 628b, may comprise any appropriate adhesive disclosed herein or known in the art for such use. In one embodiment, the adhesive layers 624a, 624b, and the transfer adhesive layers 628a, 628b are permanent pressure sensitive adhesives. In one embodiment, the adhesive layers 624a, 624b, and the transfer adhesive layers 628a, 628b are pressure sensitive adhesive S2001, which is a clear permanent pressure sensitive adhesive available from Avery Dennison Corporation. The coat weight of these adhesives ranges up to about 30 gsm, and in one embodiment from about 0.5 to about 30 gsm, or from about 2 to about 20 gsm.

In one embodiment, the layer 104, referred to generally as a pressure sensitive adhesive layer comprises one of the indicator compositions described hereinabove. In one embodiment, the layer 104 comprises an indicator in a printable indicator base matrix. In one such embodiment, the layer 104 comprises an acid-base indicator in a base matrix such as the Film III C Extender Varnish, available from Environmental Inks & Coatings. In another such embodiment, the layer 104 comprises an acid-base indicator in a base matrix such as the Film III C Opaque White, available from Environmental Inks & Coatings. In one embodiment a time-delay barrier, such as that described above with reference to FIGS. 11 and 12, may be inserted between the layers 104 and 106 of the embodiment shown and described with respect to FIGS. 16-19.

In one embodiment, where a varnish is used for the indicator layer 104, the indicator composition may comprise from about 0.4 wt % to about 2 wt % of a suitable indicator (e.g., Cresol Red) in the varnish. The varnish may be applied in one embodiment at a coat weight from about 1 to about 15 gsm, in one embodiment about 9 gsm, and in one embodiment from about 2 to about 5 gsm.

In one embodiment, the face layer 620 and the transfer carrier layers 626a and 626b may be any suitable polymeric material disclosed herein or known in the art. In one embodiment, the face layer 620 and the transfer carrier layers 626a and 626b may be a polymeric material such as PET or BOPP.

In one embodiment, the protective release layers 622a and 622b may comprise any suitable release material disclosed herein or known in the art. In one embodiment, the protective release layers 622a and 622b comprise the same materials as disclosed for use in the release layer 112. In one embodiment, the protective release layers 622a and 622b comprise a 1.5 mil thick layer of fluoro-silicone treated PET, in one embodiment, from about 1 to about 10 mils thick layer or of a pre-lacquered backing of similar thickness, as known in the art.

Figure 17:
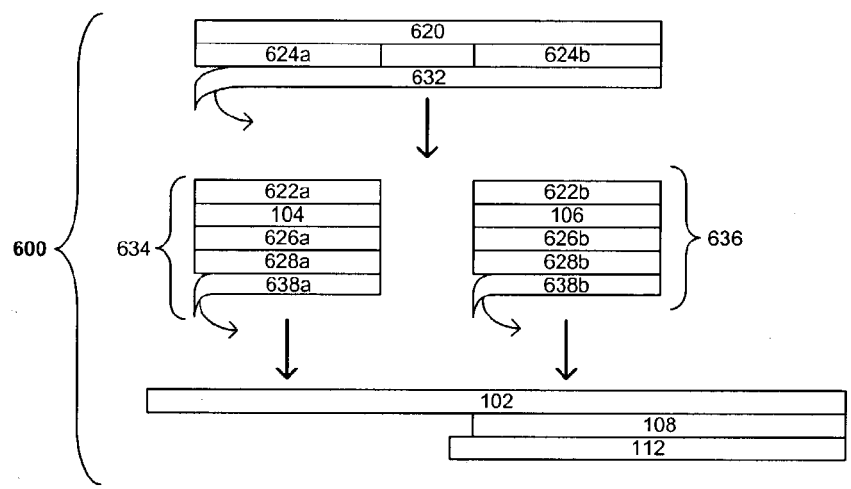
FIG. 17 is a schematic cross-sectional view depicting several of the steps in assembling the time-temperature indicating label of FIG. 16.

FIG. 17 is a schematic cross-sectional view depicting several of the steps in assembling the time-temperature indicating label 600 of FIG. 16. As shown in FIG. 17, an overlaminate 630 is provided. The overlaminate includes the face layer 620 and the adhesive layers 622a, 622b, and further includes a release liner 632. The release liner 632 may be made of any suitable release material, such as a 1 mil PET liner or a pre-lacquered backing.

As shown in FIG. 17, an acid-base laminate 634 and an indicator laminate 636 are provided. The acid-base laminate 634 includes the adhesive layer 624a, the protective release layer 622a, the pressure sensitive adhesive layer 104, the transfer carrier layer 626a, the transfer adhesive 628a, and a release liner 638a. Similarly, the indicator laminate 636 includes the adhesive layer 624b, the protective release layer 622b, the polymeric material layer 106, the transfer carrier layer 626b, the transfer adhesive 628b, and a release liner 638b.

As shown in FIG. 17, the substrate 102, with the attached adhesive 108 and release liner 112, are also provided.

To assemble the time-temperature indicating label 600, the release liners 632, 638a and 638b are removed, as shown schematically in FIG. 17, and the respective structures are assembled, as shown schematically in FIG. 17 and indicated by the arrows. As a result of these steps, the label 600 depicted in FIG. 16 is obtained.

Figure 18:
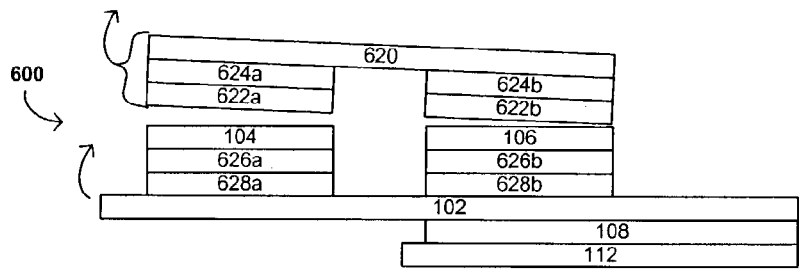
FIG. 18 is a schematic cross-sectional view depicting the step of removing portions of the time-temperature indicating label of FIG. 16, during the activation of the label.

FIG. 18 is a schematic cross-sectional view depicting the step of removing portions of the time-temperature indicating label of FIG. 16, during the activation of the label 600. As shown in FIG. 18, to activate the label 600, the face layer 620, together with the adhesive layers 624a, 624b, and the protective release liners 622a, 622b, are removed, exposing the acid-base indicator-containing pressure-sensitive adhesive layer 104 and the activator-containing polymeric material layer 106. These layers 104 and 106 are now ready for activation of the label 600, by folding over the label 600 to bring these layers 104 and 106 into activating contact with each other. It is noted that, in this embodiment, as in the previously described embodiments, that the locations of the acid-base indicator and the activator, although described here as being contained, respectively, in the pressure sensitive adhesive layer 104 and the polymeric material layer 106, may be interchanged.

Figure 19:
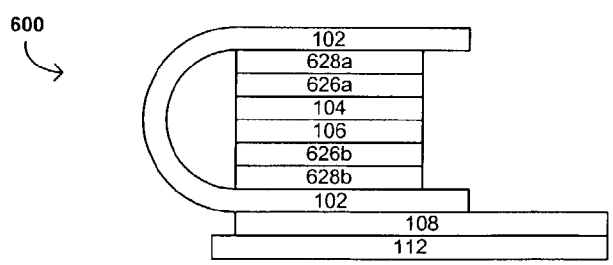
FIG. 19 is a schematic cross-sectional view of the sixth embodiment of the time-temperature indicating label, as shown in FIGS. 16-18, in which portions of the label have been removed, and the label has been activated, including folding over the label substrate to bring the acid-base indicator in the first pressure sensitive adhesive into activating contact with the activator in the polymeric material, in accordance with the present invention.

FIG. 19 is a schematic cross-sectional view of the sixth embodiment of the time-temperature indicating label 600, as shown in FIGS. 16-18, in which portions of the above-described label have been removed, and the label 600 has been activated, including folding over the label substrate 102 to bring the acid-base indicator in the pressure sensitive adhesive layer 104 into activating contact with the activator in the polymeric material layer 106, in accordance with the present invention.

Figure 20:
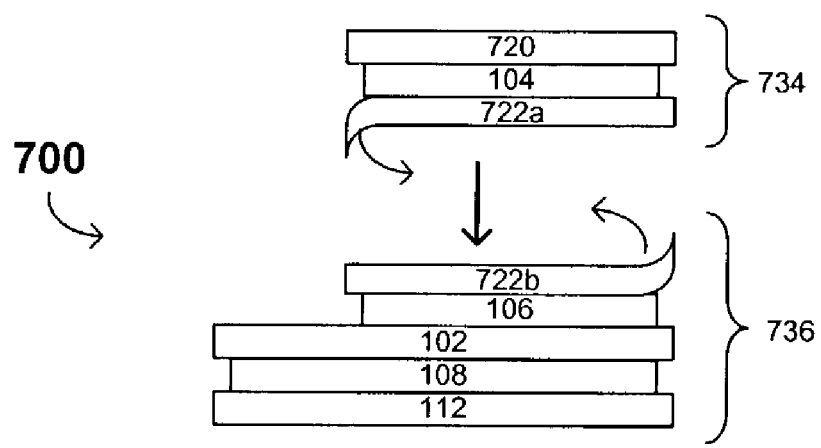
FIG. 20 is a schematic cross-sectional view of a seventh embodiment of the time-temperature indicating label, depicting several of the steps in assembling and activating the label, in accordance with the present invention.
Figure 21:
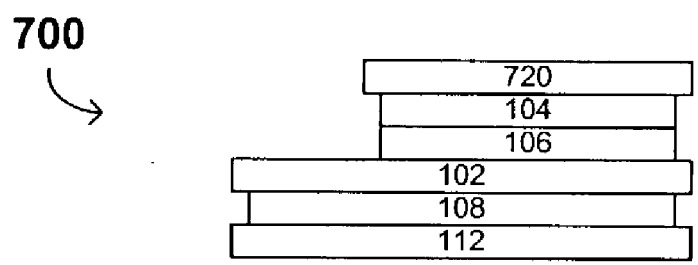
FIG. 21 is a schematic cross-sectional view of the seventh embodiment of the time-temperature indicating label, as shown in FIG. 20, in which portions of the label have been removed, and the label has been activated, including bringing the acid-base indicator in the first pressure sensitive adhesive into activating contact with the activator in the polymeric material, in accordance with the present invention.

Referring now to FIGS. 20-21, there is shown schematic cross-sectional views of a seventh embodiment of a time-temperature indicating label 700 of the present invention. As noted above, in the following, like reference numerals are applied to like elements, and the specific description will be omitted, since such elements may be substantially the same as those disclosed and described above. FIG. 20 is a schematic cross-sectional view of the seventh embodiment of the time-temperature indicating label 700, depicting several of the steps in assembling and activating the label 700, in accordance with the present invention. The materials used in the label 700 may be the same as the materials used in the label 600, or as any of the materials described herein for corresponding layers, and may be suitably selected by those of ordinary skill in the art.

As shown in FIG. 20, two laminate structures 734 and 736 are provided. The first laminate structure 734 includes the pressure sensitive adhesive layer 104, a protective face layer 720 and a protective release layer 722a. The second laminate structure 736 includes the polymeric material layer 106, a protective release layer 722a, the substrate 102, the all-temperature adhesive 108 and the release liner 112. As shown in FIG. 20, to simultaneously assemble and activate the time-temperature indicating label 700, the protective release layers 722a and 722b are removed, which exposes the pressure sensitive adhesive layer 104 and the polymeric material layer 106. These layers 104 and 106 are then brought into contact with each other, which simultaneously assembles the label 700 as shown in FIG. 21 and activates the time-temperature indicating function of the label 700.

FIG. 21 is a schematic cross-sectional view of the seventh embodiment of the time-temperature indicating label 700, as shown in FIG. 20, in which the above-noted portions of the respective laminates 734 and 736 have been removed, and the label 700 has been both assembled and activated, including bringing the acid-base indicator in the first pressure sensitive adhesive layer 104 into activating contact with the activator in the polymeric material layer 106, in accordance with the present invention. It is noted that, in this embodiment, as in the previously described embodiments, that the locations of the acid-base indicator and the activator, although described here as being contained, respectively, in the pressure sensitive adhesive layer 104 and the polymeric material layer 106, may be interchanged.

Examples of the Time-temperature Indicating Label

The following Examples illustrate the time-temperature indicating label of the present invention. Unless otherwise indicated in the following Examples and elsewhere in the specification and claims, all parts and percentages are by weight, temperatures are in degrees Celsius, pressures are at or near atmospheric pressure, and times are in minutes (m), hours (h) or days (d), as appropriate. The following Examples are intended to illustrate and provide an understanding of the present invention, and are not intended to limit the scope thereof, which is defined by the claims.

EXAMPLE TTI-1

In Example TTI-1 the following notations are employed:

| | |
|---|---|
| Acrylic A-13: | Solvent-based PSA (Polytec 7000) with 20% A-13 AS-32611 MF |
| Acrylic MY: | Emulsion PSA (AVC 5391) with 0.5% metanil yellow |
| Rubber A-13: | PIB dissolved in solvent with 20% A-13 |
| Rubber MY: | SBR emulsion PSA (Rovene 4823L) with 0.5% metanil yellow (Rovene from Mallard Creek Polymers, Inc.) |

In Example TTI-1, time-temperature indicating labels are prepared in accordance with the present invention. In each sample, an activator (A-13) is prepared in a polymeric material, and an acid-base indicator (metanil yellow) is prepared in a pressure sensitive adhesive. In one example, the activator is prepared in a polymeric material (PIB) which is not a pressure sensitive adhesive, and in another example, the activator is prepared in polymeric material which is a pressure sensitive adhesive.

The following times are determined at 45° C., 25° C. and 5° C., as indicated in Table 3. The times are measured from initial activation of the time-temperature indicating label, when the activator-containing polymeric material is brought into activating contact with the acid-base indicator-containing pressure sensitive adhesive, until the color change of the acid-base indicator becomes visible. Layers of the respective materials are applied at a loading of 20 grams per square meter (gsm).

TABLE 3

| Activator/ Acid-base Indicator | Time to Color Visible Through Label Substrate at Temperature | | |
|---|---|---|---|
| | 45° C. | 25° C. | 5° C. |
| Acrylic A-13 Acrylic MY | 4 h | 8 h | 15 d |
| Rubber A-13 Acrylic MY | 29 h | 17 d | >>40 d |
| Acrylic A-13 Rubber MY | 6 h | 48 h | 40 d |
| Rubber A-13 Rubber MY | 101 h | >40 d | >>40 d |

EXAMPLE TTI-2

The following examples demonstrate the reproducibility of the time-temperature indicating label, using Cresol Red as the acid-base indicator. Three series of examples are provided, with loadings of 0.2%, 0.5% and 1% Cresol Red as the acid-base indicator in a single pressure sensitive adhesive. The pressure sensitive adhesive used in these tests is the acrylic emulsion PSA (AVC 5391) used in Example TTI-1. In Example TTI-2, the activator is Rubber A-13 (PIB dissolved in solvent with 20% A-13).

The following times are determined at 45° C., 25° C. and 5° C., as indicated in Tables 4, 5 and 6 for each of the respective loadings of Cresol Red in a single pressure sensitive adhesive. The times are measured from initial activation of the time-temperature indicating label, when the activator-containing polymeric material is brought into activating contact with the Cresol Red-containing pressure sensitive adhesive, until the color change of the Cresol Red becomes visible. Layers of the respective materials are applied at the coat weights shown in Tables 4, 5 and 6 in grams per square meter (gsm).

TABLE 4

| Acrylic Emulsion PSA w/ Cresol Red 0.2% | Time to Color Visible Through Label Substrate at Temperature | | |
|---|---|---|---|
| Coat Weight (gsm) | 45° C. | 25° C. | 5° C. |
| 13 | 10 m | 150 m | 6 d |
| 14 | 5 m | 150 m | 6 d |
| 10.8 | 10 m | 90 m | 6 d |
| 10.2 | 10 m | 120 m | 6 d |
| 12.4 | 10 m | 120 m | 6 d |
| 10.2 | 5 m | 90 m | 6 d |
| 9.6 | 5 m | 120 m | 6 d |
| 10.8 | 10 m | 120 m | 6 d |
| 9.4 | 5 m | 90 m | 6 d |
| 17.6 | 30 m | 360 m | 8 d |
| 16.0 | 25 m | 300 m | 8 d |
| 19.8 | 40 m | 390 m | 8 d |
| 17.0 | 30 m | 360 m | 8 d |
| 16.2 | 25 m | 300 m | 8 d |
| 19.6 | 40 m | 390 m | 8 d |
| 17.8 | 30 m | 360 m | 8 d |
| 17.2 | 25 m | 330 m | 8 d |
| 19.8 | 40 m | 390 m | 8 d |

As shown in Table 4, excellent reproducibility is obtained with 0.2% Cresol Red as the acid-base indicator. In addition, as shown in Table 4, the time to color change can be adjusted and controlled based on the loading of acid-base indicator-containing PSA applied to the label substrate.

TABLE 5

| Acrylic Emulsion PSA w/ Cresol Red 0.5% | Time to Color Visible Through Label Substrate at Temperature | | |
|---|---|---|---|
| Coat Weight (gsm) | 45° C. | 25° C. | 5° C. |
| 6.0 | 10 m | 120 m | 4 d |
| 8.8 | 10 m | 120 m | 4 d |
| 9.6 | 20 m | 120 m | 4 d |
| 6.8 | 10 m | 120 m | 4 d |
| 7.8 | 10 m | 120 m | 4 d |
| 9.4 | 20 m | 120 m | 4 d |
| 8.0 | 10 m | 120 m | 4 d |
| 9.0 | 10 m | 120 m | 4 d |
| 10.8 | 20 m | 120 m | 4 d |
| 19.4 | 40 m | 570 m | 12 d |
| 17.4 | 40 m | 540 m | 12 d |
| 18.0 | 40 m | 570 m | 12 d |

TABLE 5-continued

| Acrylic Emulsion PSA w/ Cresol Red 0.5% | Time to Color Visible Through Label Substrate at Temperature | | |
|---|---|---|---|
| Coat Weight (gsm) | 45° C. | 25° C. | 5° C. |
| 18.0 | 40 m | 570 m | 12 d |
| 17.2 | 40 m | 540 m | 12 d |
| 18.2 | 40 m | 570 m | 12 d |
| 19.0 | 40 m | 570 m | 12 d |
| 17.6 | 40 m | 570 m | 12 d |
| 18.2 | 40 m | 570 m | 12 d |

As shown in Table 5, excellent reproducibility is obtained with 0.5% Cresol Red as the acid-base indicator. In addition, as shown in Table 5, the time to color change can be adjusted and controlled based on the loading of acid-base indicator-containing PSA applied to the label substrate.

TABLE 6

| Acrylic Emulsion PSA w/ Cresol Red 1.0% | Time to Color Visible Through Label Substrate at Temperature | | |
|---|---|---|---|
| Coat Weight (gsm) | 45° C. | 25° C. | 5° C. |
| 11.8 | 10 m | 150 m | 6 d |
| 10.4 | 10 m | 120 m | 6 d |
| 9.2 | 10 m | 150 m | 6 d |
| 10.2 | 10 m | 120 m | 6 d |
| 8.6 | 5 m | 90 m | 6 d |
| 10.0 | 10 m | 150 m | 6 d |
| 8.6 | 5 m | 120 m | 6 d |
| 7.6 | 5 m | 90 m | 6 d |
| 10.4 | 10 m | 150 m | 6 d |
| 20.4 | 50 m | 450 m | 16 d |
| 19.0 | 35 m | 420 m | 16 d |
| 19.4 | 50 m | 540 m | 16 d |
| 18.8 | 35 m | 450 m | 16 d |
| 16.8 | 30 m | 390 m | 9 d |
| 18.8 | 40 m | 540 m | 16 d |
| 17.8 | 35 m | 420 m | 9 d |
| 16.2 | 25 m | 390 m | 9 d |
| 18.8 | 40 m | 540 m | 16 d |

As shown in Table 6, excellent reproducibility is obtained with 1.0% Cresol Red as the acid-base indicator. In addition, as shown in Table 6, the time to color change can be adjusted and controlled based on the loading of acid-base indicator-containing PSA applied to the label substrate.

EXAMPLE TTI-3

The following examples demonstrate the reproducibility of the time-temperature indicating label of the present invention, using Bromophenol Blue as the acid-base indicator. Three series of examples are provided, with loadings of 0.2%, 0.5% and 1% Bromophenol Blue as the acid-base indicator in a single pressure sensitive adhesive. The pressure sensitive adhesive used in these tests is the acrylic emulsion PSA (AVC 5391) used in Example TTI-1. In Example TTI-3, the activator is Rubber A-13 (PIB dissolved in solvent with 20% A-13).

The following times are determined at 45° C., 25° C. and 5° C., as indicated in Tables 7, 8 and 9 for each of the respective loadings of Bromophenol Blue in a single pressure sensitive adhesive. The times are measured from initial activation of the time-temperature indicating label, when the activator-containing polymeric material is brought into activating contact with the Bromophenol Blue-containing pressure sensitive adhesive, until the color change of the Bromophenol Blue becomes visible. Layers of the respective materials are applied at the coat weights shown in Tables 7, 8 and 9 in grams per square meter (gsm).

TABLE 7

| Acrylic Emulsion PSA w/ Bromophenol Blue 0.2% | Time to Color Visible Through Label Substrate at Temperature | | |
|---|---|---|---|
| Coat Weight (gsm) | 45° C. | 25° C. | 5° C. |
| 9.4 | 10 m | 120 m | 6 d |
| 11.6 | 15 m | 150 m | 6 d |
| 10.2 | 10 m | 120 m | 6 d |
| 9.4 | 10 m | 120 m | 6 d |
| 9.6 | 10 m | 120 m | 6 d |
| 10.6 | 10 m | 120 m | 6 d |
| 9.6 | 10 m | 90 m | 6 d |
| 8.6 | 10 m | 90 m | 6 d |
| 11.6 | 10 m | 120 m | 6 d |
| 20.6 | 45 m | 510 m | 16 d |
| 17.2 | 35 m | 420 m | 10 d |
| 16.2 | 35 m | 390 m | 10 d |
| 19.8 | 40 m | 480 m | 16 d |
| 17.2 | 35 m | 360 m | 10 d |
| 16.2 | 35 m | 390 m | 10 d |
| 19.6 | 35 m | 450 m | 16 d |
| 16.8 | 30 m | 360 m | 10 d |
| 16.8 | 30 m | 390 m | 10 d |

As shown in Table 7, excellent reproducibility is obtained with 0.2% Bromophenol Blue as the acid-base indicator. In addition, as shown in Table 7, the time to color change can be adjusted and controlled based on the loading of acid-base indicator-containing PSA applied to the label substrate.

TABLE 8

| Acrylic Emulsion PSA w/ Bromophenol Blue 0.5% | Time to Color Visible Through Label Substrate at Temperature | | |
|---|---|---|---|
| Coat Weight (gsm) | 45° C. | 25° C. | 5° C. |
| 7.8 | 10 m | 150 m | 4 d |
| 9.4 | 10 m | 150 m | 4 d |
| 9.0 | 20 m | 180 m | 5 d |
| 8.8 | 10 m | 150 m | 4 d |
| 8.0 | 10 m | 150 m | 4 d |
| 9.8 | 20 m | 180 m | 5 d |
| 9.0 | 10 m | 180 m | 3 d |
| 9.0 | 10 m | 180 m | 3 d |
| 11.0 | 20 m | 210 m | 10 d |
| 19.2 | 50 m | 630 m | 20 d |
| 17.2 | 40 m | 600 m | 20 d |
| 17.0 | 50 m | 750 m | 20 d |
| 18.4 | 50 m | 720 m | 20 d |
| 16.8 | 40 m | 600 m | 20 d |
| 18.4 | 50 m | 750 m | 20 d |
| 19.0 | 50 m | 690 m | 20 d |
| 16.6 | 40 m | 600 m | 20 d |
| 18.0 | 50 m | 750 m | 20 d |

As shown in Table 8, excellent reproducibility is obtained with 0.5% Bromophenol Blue as the acid-base indicator. In addition, as shown in Table 8, the time to color change can be adjusted and controlled based on the loading of acid-base indicator-containing PSA applied to the label substrate.

TABLE 9

| Acrylic Emulsion PSA w/ Bromophenol Blue 1.0% | Time to Color Visible Through Label Substrate at Temperature | | |
|---|---|---|---|
| Coat Weight (gsm) | 45° C. | 25° C. | 5° C. |
| 8.2 | 10 m | 150 m | 6 d |
| 8.4 | 10 m | 150 m | 6 d |

TABLE 9-continued

| Acrylic Emulsion PSA w/ Bromophenol Blue 1.0% | Time to Color Visible Through Label Substrate at Temperature | | |
|---|---|---|---|
| Coat Weight (gsm) | 45° C. | 25° C. | 5° C. |
| 9.0 | 10 m | 120 m | 6 d |
| 8.0 | 10 m | 120 m | 6 d |
| 8.2 | 10 m | 120 m | 6 d |
| 8.4 | 10 m | 120 m | 6 d |
| 8.8 | 10 m | 150 m | 6 d |
| 9.0 | 10 m | 150 m | 6 d |
| 7.6 | 5 m | 90 m | 6 d |
| 17.8 | 40 m | 510 m | 16 d |
| 16.0 | 40 m | 450 m | 16 d |
| 14.4 | 35 m | 360 m | 16 d |
| 18.4 | 45 m | 540 m | 16 d |
| 15.8 | 40 m | 450 m | 16 d |
| 15.8 | 40 m | 420 m | 16 d |
| 19.8 | 50 m | 570 m | 16 d |
| 16.4 | 40 m | 540 m | 16 d |
| 17.6 | 40 m | 540 m | 16 d |

As shown in Table 9, excellent reproducibility is obtained with 1.0% Bromophenol Blue as the acid-base indicator. In addition, as shown in Table 9, the time to color change can be adjusted and controlled based on the loading of acid-base indicator-containing PSA applied to the label substrate.

EXAMPLE TTI-4

As noted above, the time required for a color change to appear in the time-temperature indicating label of the present invention may be adjusted and controlled by selection of, inter alia, the pressure sensitive adhesive in which the acid-base indicator and the activator are contained. Example TTI-4 demonstrates the effect on color-appearance times of the nature of the pressure sensitive adhesive in which both the acid-base indicator and the activator are contained. In the following, Cresol Red is used as the acid-base indicator, at a concentration of 0.5% in either an acrylic pressure sensitive adhesive or a rubber pressure sensitive adhesive. In each case, the activator is A-13 in the opposite material, i.e., when the acid-base indicator is in an acrylic pressure sensitive adhesive, the activator is in a rubber pressure sensitive adhesive, and vice-versa. In each group, a range of loadings are included. The results shown in Table 10 demonstrate that the color-appearance time can be adjusted and controlled based on the material in which the acid-base indicator and the activator are contained.

TABLE 10

| 0.5% Cresol Red in Acrylic PSA A-13 in Rubber PSA | | | 0.5% Cresol Red in Rubber PSA A-13 in Acrylic PSA | | |
|---|---|---|---|---|---|
| Loading | Time to Color Appearance | | Loading | Time to Color Appearance | |
| (gsm) | 45° C. | RT | (gsm) | 45° C. | RT |
| 6.0 | 5 h | 60 h | 9.6 | 20 m | 5 h |
| 6.8 | 5 h | 60 h | 10.0 | 20 m | 5 h |
| 8.0 | 5 h | 60 h | 10.2 | 20 m | 5 h |
| 8.8 | 5 h | 60 h | 11.8 | 20 m | 5 h |
| 7.8 | 5 h | 60 h | 11.6 | 20 m | 5 h |
| 9.0 | 5 h | 60 h | 11.4 | 20 m | 5 h |
| 9.6 | 5 h | 60 h | 14.2 | 50 m | 12 h |
| 9.4 | 5 h | 60 h | 14.6 | 50 m | 12 h |
| 10.8 | 5 h | 60 h | 14.8 | 50 m | 12 h |
| 17.4 | 16 h | 148 h | 16.4 | 180 m | 25 h |
| 17.2 | 16 h | 148 h | 17.2 | 180 m | 25 h |
| 17.6 | 16 h | 148 h | 17.6 | 190 m | 25 h |
| 18.0 | 16 h | 148 h | 19.8 | 180 m | 27 h |
| 18.2 | 16 h | 148 h | 19.4 | 180 m | 27 h |
| 18.2 | 16 h | 148 h | 19.6 | 190 m | 27 h |
| 19.4 | 16 h | 148 h | — | — | — |
| 18.0 | 16 h | 148 h | — | — | — |
| 19.0 | 16 h | 148 h | — | — | — |

Name Badges

As described above, the time indicating label may be used as a name badge. The name badge has the benefit of providing a visual color change to indicate that the name badge has been used and the active time for the badge has expired.

In one embodiment, the name badge comprises a printable substrate having a first and second surface, an acid-base indicator composition on the first surface of the substrate and an activator composition. The indicator composition and the activator composition are capable of adhering to the each other either directly or through one or more intermediate layers like pressure sensitive adhesive.

The printable substrates include those discussed above. Paper and card stock substrates are particularly useful. Topcoated paper and card stock are useful because of their improved ink adhesion.

In one embodiment, the name badge is a laminated name badge where the indicator composition is present on a portion of the printable substrate and an adhesive is present on the polymeric flap which covers the substrate after the indicia has been printed. These constructions may be handwritten or printed with an inkjet or laser printer. Below, the activator composition, is present in the transparent laminating sheet and the indicator composition is on the identification card-forming section.

These constructions comprise an assembly which includes a display card-forming section and an identification card-forming section. The identification card-forming section includes a first backing sheet and contains an identification card backing region. Further included is a first adhesive layer, a first release layer joined to the first side of the backing sheet and to the first adhesive layer except at the identification card backing region where there is an opening in the first release layer, and a transparent lamination sheet. The transparent lamination sheet has a first side, joined to the first adhesive layer. The transparent lamination sheet includes an identification card back covering portion aligned with the opening and an identification card front covering portion adjacent to and substantially similar in size to the identification card back covering portion, where the identification card front and back covering portions are separable from the transparent lamination sheet and joined at a location substantially aligned with a side edge of the identification card backing region.

Another aspect of the invention relates to a longitudinally extending assembly for creating a display card and a laminated identification card which are suitable for printing by a laser or ink jet printer, or a photocopier. The assembly includes a display card-forming section extending along part of the length of the assembly and an identification card-forming section attached to the display card-forming section and extending along part of the length of the assembly. The identification card-forming section includes a first backing sheet which includes opposed first and second sides and contains an identification card backing region separable from the first backing sheet defined by opposite top and bottom edges joined by opposite side edges within the first backing sheet where the second side is suitable for being printed on. The identification card-forming section further includes a first adhesive layer, a first release layer joined to the first side of the first backing sheet and to the first adhesive layer except at the identification card backing region where there is an opening in the first release layer, and a transparent lamination sheet. The transparent lamination sheet has a first side, joined to the first adhesive layer. The transparent lamination sheet includes an identification card back covering portion aligned with the opening and an identification card front covering portion adjacent to and substantially similar in size to the identification card back covering portion. The identification card front and back covering portions are separable from the transparent lamination sheet and joined at a location substantially aligned with a side edge of the identification card backing region. The laminated identification card is formed by separating the identification card backing region and the identification card front and back covering portions from the assembly, folding the identification card front covering portion over the second side of the identification card backing region, and joining the identification card front covering portion to the identification card backing region with the adhesive layer.

Another aspect of the invention relates to a longitudinally extending assembly having a width and a length for creating laminated cards for printing by a laser printer, ink jet printer, or photocopier. The assembly includes a display card-forming section extending along part of the length of the assembly and an identification card-forming section attached to the display card-forming section and extending along part of the length of the assembly. The identification card-forming section includes a longitudinally extending backing sheet which has a first side and a second side suitable for receiving printing. The backing sheet may also be die cut to provide at least one opening with a card having an extent which completely fills the opening and which is removably positioned in the opening. A lamination sheet is adhesively adhered to a first portion of the first side of the backing sheet. The lamination sheet may also be die cut to provide a removable lamination strip which adheres to and covers one surface of the card and which is also removably adhered to the backing sheet in the area adjacent to the opening. The assembly has a substantially constant thickness across the entire width and length of the assembly to prevent jamming in the laser or ink jet printer.

The backing sheet may have certain areas which have a release coating for convenience in peeling back a portion of the transparent plastic laminating sheet. Alternatively, the backing sheet may be coated across its entire width and length with a release coating. Additionally, the assembly is preferably no more than fifteen mils thick, to prevent jamming in a complex printer sheet feed path. Permanent pressure sensitive adhesive may be employed to secure the cards to and within the lamination. Further, the laminating plastic preferably has an area slightly more than twice that of the card, so that it may cover both sides of the card and seal around the edges thereof.

Another aspect of the invention relates to a method for creating a laminated card from a longitudinally extending assembly. The assembly includes a display card-forming section extending along part of the length of the assembly and an identification card-forming section attached to the display card-forming section and extending along part of the length of the assembly. The identification card-forming section includes a first backing sheet having opposed first and second sides and containing an identification card backing region separable from the first backing sheet. The identification card-forming section is defined by opposite top and bottom edges joined by opposite side edges within the first backing sheet. The second side is suitable for being printed on. This section also includes a first adhesive layer, a first release layer joined to the first side of the first backing sheet and to the first adhesive layer except at the identification card backing region where there is an opening in the first release layer, and a transparent lamination sheet. The transparent lamination sheet has a first side and is joined to the first adhesive layer. The transparent lamination sheet includes an identification card back covering portion aligned with the opening and an identification card front covering portion adjacent to and substantially similar in size to the identification card back covering portion, where the identification card front and back covering portions are separable from the transparent lamination sheet and joined at a location substantially aligned with a side edge of the identification card backing region. The method includes separating the identification card backing region and the identification card front and back covering portions from the assembly, folding the identification card front covering portion over the second side of the identification card backing region, and joining the identification card front covering portion to the identification card backing region with said adhesive layer.

The present invention also encompasses another method for creating a laminated card from an assembly. The assembly has a backing sheet, a card which has been die cut from the backing sheet and which has a printing surface, a lamination sheet adhesively adhered to the backing sheet and to the die cut card, and a lamination strip. The lamination strip has been die cut from the lamination sheet, and it adheres to the card and to the backing sheet adjacent to the die cut card. The backing sheet may have a release coating in at least some of the areas where the lamination adheres to the backing sheet. The assembly may have substantially constant thickness and substantially flat upper and lower surfaces. The method includes removing the card and the lamination strip together from the assembly, with the card being adhered on the side opposite to its printing surface of the lamination strip. The lamination strip may be folded over to cover the printing surface of the card and the lamination strip and the entire card are pressed firmly to seal the lamination strip over the card.

In accordance with various other steps that may be included in the method, the lamination strip may include a line of perforations dividing the lamination member into two symmetrical halves, and the step of folding the lamination strip over may include folding the lamination strip over at the line of perforations. The printing surface of the card is thereby covered by the lamination strip, and the line of perforations assist the user in folding the lamination strip in the proper orientation. A laser printer may perform the step of printing onto the printing surface of the card. The card may have edges, with the lamination strip extending beyond the edges of the card. The step of pressing the lamination strip and the entire card to seal the lamination strip over the card may then include pressing the lamination strip about the edges of the card to seal the lamination strip about the edges of the card.

The identification card assemblies are described in U.S. Pat. Nos. 6,159,570 issued to Ulrich et al and 5,662,976, issued to Popat et al, both assigned on their face to the Avery Dennison Corporation. These patents are incorporated by reference for their descriptions of the identification card assemblies and their uses and manufacture methods.

The identification cards are prepared with the indicator composition printed or coated onto the card and the activator composition coated onto the polymeric laminating portions. A number of embodiments are described in the following with reference to FIGS. 22-31.

In the following embodiments, the materials used may include the following, or any of the materials disclosed herein.

In one embodiment, the backing layer is comprised of heavy paper or hard cardboard. The backing layer has a thickness of between about 4 and 10 mils, with approximately 6.0 mil being especially desirable. The backing seat may be made from 100 lb. Velum card stock, which is available from a wide variety of paper manufacturers, such as the Simpson Corporation, or 80# Litho from Boise Cascade (Boise, Iowa).

The backing layer may contain a thin coating to prevent firm adherence of the lamination to the backing layer and to facilitate peeling the lamination layer off of the backing sheet. The coating may comprise a silicon release coating. Alternatively, fluorinated or amine-based release coatings, or any other desirable coating may be used. The release coating should be thin, in the range of between approximately 0.1 and 0.5 mils.

In one embodiment, the construction further comprises a lamination layer which is releasably attached to the backing layer. The lamination sheet may be made from any of a number of materials, such as Mylar or other suitable transparent sheets which are suitable for laser printing, ink jet printing, or photocopier use. The lamination sheet may have a coating that is receptive to toners and inks so that the finished card may have printing on the surface of the card, as well as on the surface of the lamination. Printing on the surface of the lamination would most commonly be by an offset printing process, although it would be possible to print onto the lamination with a laser printer, ink jet printer or photocopiers.

Suitable coated and uncoated Mylar lamination films are available from DuPont and the Dunmore Corporation. The lamination sheet should be between 1 and 4 mils thick, with 2 mils being desirable.

In one embodiment the adhesive layer is a pressure-sensitive adhesive. The pressure-sensitive adhesive should be one which does not easily degrade when exposed to ultra-violet light. That is, exposure to ultra-violet light during normal use of the card should not turn the adhesive yellow or cause the adhesive to lose its tackiness. One such adhesive as described in U.S. Pat. No. 5,262,216 which is hereby incorporated by reference. A suitable adhesive is the P60 Hot Melt Adhesive which is available from Avery Dennison Corporation. Generally, the adhesive may be applied to the lamination layer in a coat of between about 0.25 and about 2 mils thick. The pressure-sensitive adhesive should be of a type which will not flow at a temperature of a few hundred degrees Fahrenheit. However, it is preferred that the pressure-sensitive adhesive will remain stable when subjected to temperatures in the range of up to about 300° F. to 400° F. (about 149° C. to about 204° C.) to facilitate printing on the cards through laser or other high temperature printing equipment.

In the following description, the name badges and other items may have any selected shape. The examples are described with respect to a rectangular shape, but it is to be understood the invention is not so limited.

The name badges may be better understood by referring to the drawings. FIGS. 22a-e are a series of schematic drawings showing a cross-sectional area of a name badge and plan view illustrating its use. Name badge 2200 is constructed of a transparent film 2201, an adhesive coating that incorporates an activator 2202, a release coating 2203, and a paper or card stock 204 which may or may not incorporate an ink jet receptive top coating. During the converting operation, paper or card stock 2204 is die cut into an approximately rectangular shape as shown in FIG. 22b. The transparent film is die cut into two approximate rectangles separated by a perforation or other weakening line (opposite side of FIG. 22b, shown in phantom). A clear or nearly clear image consisting of the indicator formulation is printed in specific location(s) within the rectangle die cut section of the paper or card stock. An optional border may be printed denoting the available area for subsequent printing in an ink jet or laser printer. This construction is cut into rectangular sheets that are compatible with ink jet or laser printers, such as 4"×6", A6, 8½"×11", A4, or some similar size.

The user prints the indicia on the paper or card stock side with an ink jet or laser printer within the approximately rectangular (or other selected shape) die cut area in a section within that area that has not been imaged with the indicator formulation (or within the optional border, as shown in FIG. 22b). The user then removes the die cut sections from the sheet as an assembly, so that the top half consists of the transparent film with the adhesive coating that incorporates the activator, and the bottom half incorporates the entire material construction (FIG. 22c). The user folds the transparent film over the bottom half, bringing the adhesive with the activator into contact with the indicator image, as well as the rest of the bottom half (FIG. 22d). This begins a migration or chemical reaction that, over a generally fixed time period (typically 8 to 24 hours), causes the indicator image to change color and become very visible, indicating that the badge is no longer valid (FIG. 22e).

Referring to FIGS. 23a-e, constructed of a transparent film 2301, an adhesive coating that incorporates an activator 2302, a release coating 2303, a paper or card stock 2304, and an ink jet receptive and/or laser printable top coating 2305. During the converting operation, paper or card stock is die cut into an approximately rectangular shape as shown. The transparent film is die cut into two approximate rectangles separated by a perforation or other weakening line (opposite side of FIG. 23b, shown in phantom). This construction is cut into rectangular sheets that are compatible with ink jet or laser printers, such as 4"×6", A6, 8½"×11", A4, or some similar size.

The user prints the indicia on the paper or card stock side with an ink jet or laser printer within the approximately rectangular die cut area in a section, as shown in FIG. 23b. The user then removes the die cut sections from the sheet as an assembly, so that the top half consists of the transparent film with the adhesive coating that incorporates the activator, and the bottom half incorporates the entire material construction (FIG. 23c). The user folds the transparent film over the bottom half, bringing the adhesive with the activator into contact with the printable indicator layer (FIG. 23d). This begins a migration or chemical reaction that, over a generally fixed time period (typically 8 to 24 hours), causes the indicator layer to change color and become very visible, indicating that the badge is no longer valid (FIG. 23e).

Referring to FIGS. 24a-f, the name badge is constructed of a transparent film 2401, an adhesive coating that incorporates an activator 2402, a release coating 2403, and a paper stock 2404 which may or may not incorporate an ink jet receptive top coating 2407. During the converting operation, the paper is die cut into an approximately rectangular shape as shown (opposite side of FIG. 24b, shown in phantom). The transparent film is die cut into one externally concentric approximate rectangle (FIG. 24b). A clear or nearly clear image 2405 consisting of the indicator formulation is printed in specific location(s) within the rectangle die cut section of the paper. An optional border 2406 may be printed denoting the available area for subsequent printing in an ink jet or laser printer. This construction is cut into rectangular sheets that are sized to be compatible with ink jet or laser printers, such as 4"×6", A6, 8½"×11", A4, or some similar size.

The user prints the indicia on the paper side with an ink jet or laser printer within the approximately rectangular die cut area in a section within that area that has not been imaged with the indicator formulation (or within the optional border, as shown in FIG. 24c). The user then removes the die cut paper section from the sheet, inverts it (FIG. 24c), and re-inserts it into the opening that was created when it was removed (FIG. 24d). The two concentric approximate rectangles may be removed from the sheet, creating a badge with exposed adhesive around the perimeter (FIG. 24e). This may be used as a self-adhesive name badge and applied to the clothing of the user. Once the paper section is inverted and inserted back into the opening, the activator is brought into contact with the indicator image, as well as the rest of the paper section. This begins a migration or chemical reaction that, over a generally fixed time period (typically 8 to 24 hours), causes the indicator image to change color and become very visible, indicating that the badge is no longer valid (FIG. 24f).

Referring to FIGS. 25a-f, the name badge is constructed of a transparent film 2501, an adhesive coating that incorporates an activator 2502, a release coating 2503, a paper stock 2504, and an ink jet receptive and/or laser printable top coating which is also an indicator layer 2505. During the converting operation, the paper is die cut into an approximately rectangular shape as shown (opposite side of FIG. 25b, shown in phantom). The transparent film is die cut into one externally concentric approximate rectangle (FIG. 25b). This construction is cut into rectangular sheets that are sized to be compatible with ink jet or laser printers, such as 4"×6", A6, 8½"×11", A4, or some similar size.

The user prints the indicia on the paper side with an ink jet or laser printer within the approximately rectangular die cut (FIG. 25b). The user then removes the die cut paper section from the sheet, inverts it (FIG. 25c), and re-inserts it into the opening that was created when it was removed (FIG. 25d). The two concentric approximate rectangles may be removed from the sheet, creating a badge with exposed adhesive around the perimeter (adhesive is on the opposite side of FIG. 25e). This may be used as a self-adhesive name badge and applied to the clothing of the user. Once the paper section is inverted and re-inserted into the opening, the activator is brought into contact with the indicator layer. This begins a migration or chemical reaction that, over a generally fixed time period (typically 8 to 24 hours), causes the indicator layer to change color and become very visible, indicating that the badge is no longer valid (FIG. 25f).

Referring to FIGS. 26a-e, the name badge is constructed of a transparent film 2601, an adhesive coating that incorporates an activator 2602, a release coating 2603, and a paper or card stock 2604 which may or may not incorporate an ink jet receptive top coating 2607. During the converting operation, paper or card stock is die cut into an approximately rectangular shape as shown. The transparent film is die cut into two approximate rectangles separated by a perforation or other weakening line (opposite side of FIG. 26b, shown in phantom). A clear or nearly clear image 2605 consisting of the indicator formulation is printed in specific location(s) within the rectangle die cut section of the paper or card stock. An optional border 2606 may be printed denoting the available area for subsequent printing in an ink jet or laser printer. This construction is cut into rectangular sheets that are compatible with ink jet or laser printers, such as 4"×6", A6, 8½"×11", A4, or some similar size.

The user prints the indicia on the paper side with an ink jet or laser printer within the approximately rectangular die cut area in a section within the area that has not been imaged with the indicator formulation (or within the optional border, as shown in FIG. 26b). The user then removes the die cut sections from the sheet as an assembly, so that the top half consists of the transparent film with the adhesive coating that incorporates the activator, and the bottom half incorporates the entire material construction (FIG. 26c). The user folds the transparent film over the bottom half, bringing the adhesive with the activator into contact with the indicator image, as well as the rest of the bottom half (FIG. 26d), creating a badge with exposed adhesive around the perimeter (adhesive is on opposite side of FIG. 26e). This may be used as a self-adhesive name badge and applied to the clothing of the user. Once the transparent film is folded over the bottom half, the activator is brought into contact with the indicator image, as well as the rest of the paper section. This begins a migration or chemical reaction that, over a generally fixed time period (typically 8 to 24 hours), causes the indicator image to change color and become very visible, indicating that the badge is no longer valid (FIG. 26e).

Referring to FIGS. 27a-e, the name badge is constructed of a transparent film 2701, an adhesive coating that incorporates an activator 2702, a release coating 2703, and a paper stock 2704, and an ink jet receptive and/or laser printable top coating which is also an indicator layer 2704. During the converting operation, the paper stock is die cut into an approximately rectangular shape as shown. The transparent film is die cut into two approximate rectangles separated by a perforation or other weakening line (opposite side of FIG. 27b, shown in phantom). This construction is cut into rectangular sheets that are compatible with ink jet or laser printers, such as 4"×6", A6, 8½"×11", A4, or some similar size.

The user prints the indicia on the paper side with an ink jet or laser printer within the approximately rectangular die cut (FIG. 27b). The user then removes the die cut sections from the sheet as an assembly, so that the top half consists of the transparent film with the adhesive coating that incorporates the activator, and the bottom half incorporates the entire material construction (FIG. 27c). The user folds the transparent film over the bottom half, bringing the adhesive with the activator into contact with the indicator image, as well as the rest of the bottom half (FIG. 27d), creating a badge with exposed adhesive around the perimeter (adhesive is on opposite side of FIG. 27d). This may be used as a self-adhesive name badge and applied to the clothing of the user. Once the transparent film is folded over the bottom half, the activator is brought into contact with the indicator layer. This begins a migration or chemical reaction that, over a generally fixed time period (typically 8 to 24 hours), causes the indicator image to change color and become very visible, indicating that the badge is no longer valid (FIG. 27e).

Referring to FIGS. 28a-g, the name badge is constructed of an initially clear indicator layer 2805, a transparent film 2801, an adhesive coating that incorporates an activator 2802, a release coating 2803, and a paper or card stock 2804, and an optional ink jet receptive and/or laser printable top coating 2807. During the converting operation, the paper or card stock is die cut into an approximately rectangular shape as shown. The transparent film is die cut into two approximate rectangles separated by a perforation or other weakening line, with a third approximate rectangle or other shape die cut concentrically within the lower approximate rectangle (FIG. 28b). This construction is cut into rectangular sheets that are compatible with ink jet or laser printers, such as 4"×6", A6, 8½"×11", A4, or some similar size.

The user prints the indicia on the paper or card stock side with an ink jet or laser printer within the approximately rectangular die cut on the paper or card stock side (FIG. 28a, FIG. 28e). The user then removes the internally concentric rectangle from the lower portion and places it on the upper portion (FIG. 28b, FIG. 28c). The user then removes the die cut sections from the sheet as an assembly, so that the top half consists of two layers of indicator topcoat, a transparent film and the adhesive coating that incorporates the activator, and the bottom half incorporates the entire material construction (FIG. 28d). The user folds the transparent film over the bottom half, completing the badge (FIG. 28e, FIG. 28f). Once the transparent film inner concentric shape with the adhesive with activator is placed on the upper section of transparent film with the initially transparent indicator layer, the activator is brought into contact with the indicator layer. This begins a migration or chemical reaction that, over a generally fixed time period (typically 8 to 24 hours), causes the indicator layer to change color and become very visible, indicating that the badge is no longer valid (FIG. 28g).

Referring to FIGS. 29a-g, the name badge is constructed of a transparent film 2901, an adhesive coating that incorporates an activator 2902, a release coating 2903, and a paper liner 2904. During the converting operation, the transparent film is die cut into approximate rectangles, circles, or other similar shapes. A diagonal bar or another image is printed in each shape using an indicator formulation. Half the shapes are then printed (using standard inks) with one shape 2905, while the other half are printed with text (for example the letters "OK") or graphics 2906. This entire construction is then cut into rectangular sheets (FIG. 29b).

The user prints the indicia with an ink jet or laser printer on any name badge or label (FIG. 29d). The user then removes one of each of the two differently printed shapes and places one of them on the badge or label in the location of their choosing (FIG. 29c). The user then places the second printed shape directly on top of the first (FIG. 29f). Once the printed shape has been placed on the other printed shape, the adhesive with activator comes into contact with the indicator image. This begins a migration or chemical reaction that, over a generally fixed time period (typically 8 to 24 hours), causes the indicator image to change color and become very visible, indicating that the badge is no longer valid (FIG. 29g).

Referring to FIGS. 30a-g, the name badge is constructed of an initially clear indicator layer 3001, a transparent film 3002, an adhesive coating that incorporates an activator 3003, a release coating 3004, and a paper liner 3005. During the converting operation, the transparent film is die cut into approximate rectangles, circles, or other similar shapes 3006. Half the shapes are then printed (using standard inks) with one shape, while the other half are printed with text (for example the letters "OK") or graphics, or they could remain unprinted. This entire construction is then cut into rectangular sheets (FIG. 30b).

The user prints the indicia with an ink jet or laser printer on any printable name badge or label (FIG. 30d). The user then removes one of each of the two differently printed shapes and places one of them on the badge or label in the location of their choosing (FIG. 30e). The user then places the second printed shape directly on top of the first (FIG. 30f). Once the printed shape has been placed on the other printed shape, the adhesive with activator comes into contact with the indicator layer. This begins a migration or chemical reaction that, over a generally fixed time period (typically 8 to 24 hours), causes the indicator layer to change color and become very visible, indicating that the badge is no longer valid (FIG. 30g).

Referring to FIGS. 31 a-f, the name badge is constructed of a transparent film 3101, an adhesive coating that incorporates an activator 3102, a release coating 3103, and a paper liner 3104. During the converting operation, the transparent film is die cut into approximate rectangles, circles, or other similar shapes 3105. The shapes are then printed (using standard inks) with text (for example the letters "OK") and/or graphics, or they could remain unprinted. This entire construction is then cut into rectangular sheets (FIG. 31b). The second component is a printable name badge or label (initially formed in sheets that are compatible with ink jet or laser printers, such as 4"×6", A6, 8½"×11", A4, or some similar size) with a pre-printed indicator image, or alternately a inkjet printable indicator layer. This may or may not have a border delineating the intended position of the label (FIG. 31d).

The user prints the indicia with an ink jet or laser printer on a printable badge or label with the pre-printed indicator image or inkjet printable top coating. (FIG. 31d). The user then removes one of the printed shapes (FIG. 31c) and places it on the badge or label in the location that overlays the pre-printed indicator image (FIG. 31e). Once the printed shape has been placed on the indicator image or inkjet printable indicator layer, the adhesive with activator comes into contact with the indicator image or layer. This begins a migration or chemical reaction that, over a generally fixed time period (typically 8 to 24 hours), causes the indicator image or layer to change color and become very visible, indicating that the badge is no longer valid (FIG. 31f).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A time indicating label comprising (a) a foldable label substrate having a first and second surface, (b) an acid-base indicator composition on a first area of the first surface, and (c) an activator composition on a second area of the first surface, at least one of compositions (b) or (c) comprising a first pressure sensitive adhesive, wherein (b) and (c) when brought in contact by folding the label substrate remain adhered.

2. The label of claim 1 wherein the indicator composition comprises an indicator and a carrier.

3. The label of claim 2, wherein the acid-base indicator changes color at a pH of about 1.8 or less.

4. The label of claim 2 wherein the carrier is a pressure sensitive adhesive, an ink or a varnish.

5. The label of claim 2 wherein the carrier is an ink or varnish.

6. The label of claim 1 wherein the activator composition comprises an activator compound and a carrier.

7. The label of claim 6, wherein the activator compound comprises an organic acid having from about 1 to about 40 carbon atoms.

8. The label of claim 6, wherein the activator compound is an organic sulfonic acid.

9. The label of claim 6, wherein the carrier is a pressure sensitive adhesive, an ink or a varnish.

10. The label of claim 6, wherein the carrier is a pressure sensitive adhesive.

11. The label of claim 1, wherein the label substrate further comprises a second pressure sensitive adhesive on the second surface.

12. The label of claim 11, further comprising a release liner attached to the second pressure sensitive adhesive.

13. The label of claim 1 wherein the label is used as a name badge.

14. The label of claim 13, wherein the label substrate is inkjet or laser printable.

15. The label of claim 1 wherein the label is a time temperature indicator for frozen foods.

16. A time-temperature indicating label, comprising:
(a) a foldable label substrate having first and second surfaces; (b) a first pressure sensitive adhesive containing an acid-base indicator capable of changing color, the first pressure sensitive adhesive on a first area of the first surface; and (c) a polymeric material containing an acid-base activator compound on a second area of the first surface, wherein the first pressure sensitive adhesive and the polymeric material may be brought into an overlying relationship by folding the label substrate.

17. The time-temperature indicating label of claim 16, wherein the activator compound comprises an organic acid having from about 1 to about 40 carbon atoms.

18. The time-temperature indicating label of claim 16, wherein the activator compound is an organic sulfonic acid.

19. The time-temperature indicating label of claim 16, wherein the acid-base indicator changes color at a pH of about 1.8 or less.

20. The time-temperature indicating label of claim 16, wherein the label substrate further comprises a second pressure sensitive adhesive on the second surface.

21. The time-temperature indicating label of claim 20, further comprising a release liner attached to the second pressure sensitive adhesive.

22. The time-temperature indicating label of claim 16, further comprising a release liner attached to the first pressure sensitive adhesive.

23. The time-temperature indicating label of claim 16, wherein the polymeric material is a third pressure sensitive adhesive.

24. The time-temperature indicating label of claim 23, further comprising a release liner attached to the third pressure sensitive adhesive.

25. The time-temperature indicating label of claim 16, wherein the areas of the first pressure sensitive adhesive and the polymeric material are positioned so the first pressures sensitive adhesive may be overlay a majority of the polymeric material.

26. A time-temperature indicating label, comprising: (a) a foldable label substrate having a first surface and a second surface; (b) a first pressure sensitive adhesive containing an acid-base indicator capable of changing color on a first area of the first surface; (c) a polymeric material containing an activator compound capable of changing the color of the acid-base indicator on a second area of the first surface; and (d) a release liner on the first pressure sensitive adhesive.

27. The time-temperature indicating label of claim 26, wherein the activator compound is an alkyl benzene sulfonic acid, wherein the alkyl group is a straight- or branched-chain alkyl group, comprising from about 1 to about 30 carbon atoms.

28. The time-temperature indicating label of claim 26, wherein the color change is visible through the label substrate.

29. The time-temperature indicating label of claim 26, wherein the label substrate further comprises a pressure sensitive adhesive on the second surface.

30. The time-temperature indicating label of claim 26, wherein the polymeric material is a pressure sensitive adhesive.

31. The time-temperature indicating label of claim 30, further comprising a release liner attached to the pressure sensitive adhesive.

32. The time-temperature indicating label of claim 26, wherein at least a portion of the first pressure sensitive adhesive may be brought into contact with at least a portion of the polymeric material by folding the label substrate.

33. The time-temperature indicating label of claim 26, wherein at least a portion of the first pressure sensitive adhesive may be brought into contact with a majority of the polymeric material by folding the label substrate.

34. A method of determining the time-temperature history of an article, comprising: (a) providing a time-temperature indicating label, comprising: a foldable label substrate having first and second surfaces; a first pressure sensitive adhesive containing an acid-base indicator capable of changing color, the first pressure sensitive adhesive on a first area of the first surface; and a polymeric material containing an activator compound capable of causing a color change in the acid-base indicator, the polymeric material on a second area of the first surface; (b) activating the time-temperature indicating label by bringing at least a portion of the first pressure sensitive adhesive into contact with at least a portion of the polymeric material by folding the label substrate; and (c) attaching the time-temperature indicating label to a substrate.

35. The method of claim 34, wherein the polymeric material is a pressure sensitive adhesive.

36. A name badge comprising a printable substrate having a first and second surface, an acid-base indicator composition comprising an acid-base indicator and a pressure sensitive adhesive carrier on the first surface of the substrate and an activator composition which is capable of adhering to the indicator composition.

37. The name badge of claim 36 wherein the substrate is a paper or card stock.

38. The name badge of claim 36 wherein the substrate is a paper or card stock with an ink receptive coating.

39. The name badge of claim 36, wherein the acid-base indicator changes color at a pH of about 1.8 or less.

40. The name badge of claim 36 wherein the activator composition comprises an activator compound and a carrier.

41. The name badge of claim 40, wherein the activator compound comprises an organic acid having from about 1 to about 40 carbon atoms.

42. The name badge of claim 40, wherein the activator compound is an organic sulfonic acid.

43. The name badge of claim 40, wherein the carrier is a pressure sensitive adhesive, an ink or a varnish.

44. The name badge of claim 40, wherein the carrier is a pressure sensitive adhesive.

45. The name badge of claim 40, wherein The name badge substrate further comprises a second pressure sensitive adhesive on the second surface.

46. The name badge of claim 45, further comprising a release liner attached to the second pressure sensitive adhesive.

47. A method of providing name badges with a time limit, comprising the steps of providing an inkjet or laser printable substrate having a first and second surface and an acid-base indicator composition on the first surface, providing an activator composition, adhering the activator composition comprising an acid-base indicator and apressure sensitive adhesive carrier to the indicator composition wherein the indicator composition changes color to indicate that the name badge is expired.

48. The method of claim 47 wherein the activator composition is provided on a substrate through which the color change can be observed.

49. The method of claim 48 wherein the substrate is a polymeric substrate.

50. The method of claim 47 wherein the inkjet or laser printable substrate is prepared by printing or coating a substrate with the indicator composition.

* * * * *

UNITED STATES PATENT AND TRADEMARK OFFICE
CERTIFICATE OF CORRECTION

| | | |
|---|---|---|
| PATENT NO. | : 7,294,379 B2 | Page 1 of 1 |
| APPLICATION NO. | : 10/383460 | |
| DATED | : November 13, 2007 | |
| INVENTOR(S) | : Ko et al. | |

It is certified that error appears in the above-identified patent and that said Letters Patent is hereby corrected as shown below:

Column 47, line 10, replace "40" with --36--.

Signed and Sealed this

Eighteenth Day of March, 2008

JON W. DUDAS
*Director of the United States Patent and Trademark Office*